(12) United States Patent
Hung

(10) Patent No.: US 6,587,239 B1
(45) Date of Patent: *Jul. 1, 2003

(54) OPTICAL FIBER NETWORK HAVING INCREASED CHANNEL CAPACITY

(76) Inventor: Henry Hung, 4701 E. Marston Dr., Paradise Valley, AZ (US) 85253

( * ) Notice: Subject to any disclaimer, the term of this patent is extended or adjusted under 35 U.S.C. 154(b) by 0 days.

This patent is subject to a terminal disclaimer.

(21) Appl. No.: 09/510,685

(22) Filed: Feb. 23, 2000

(51) Int. Cl.[7] .......................... H04J 14/02; H04J 14/08; H04J 14/00; H04B 10/20; H04B 10/04
(52) U.S. Cl. ................ 359/124; 359/118; 359/115; 359/119; 359/125; 359/137; 359/183
(58) Field of Search .................... 359/124, 125, 359/118, 119, 120, 121, 137

(56) References Cited

U.S. PATENT DOCUMENTS 5,930,014 A  *  7/1999  Yamamoto .................. 359/118
5,991,316 A  *  11/1999  Kikuchi ....................... 372/21

* cited by examiner

Primary Examiner—Leslie Pascal
Assistant Examiner—M. R. Sedighian
(74) Attorney, Agent, or Firm—Alexander B. Ching; Squire, Sanders & Dempsey LLP

(57) ABSTRACT

Optical communication system apparatus and methods of operating an optical communications system is described. The system advantageously may utilize existing optical fiber networks and provide significantly increased channel capacity. In accordance with one aspect of the invention the system apparatus provides for a plurality of communications channels and a processor unit receives requests for allocation of one or more channels from a node coupled to the optical communications system. The system apparatus dynamically allocates one or more channels selected from unused channels.

13 Claims, 25 Drawing Sheets

OPTICAL FIBER NETWORK HAVING INCREASED CHANNEL CAPACITY

FIELD OF THE INVENTION

This invention pertains to optical communications systems, in general, and to an optical network and a method of operating an optical network, in particular.

BACKGROUND OF THE INVENTION

As used herein, the term "optical network" relates to any network that interconnects a plurality of nodes and conveys information between nodes with optical signals. The term "optical communications system" as used herein refers to any system that utilizes optical signals to convey information between one node and one or more other nodes. An optical communications system may include one or more optical networks.

Telecommunications carriers began installing optical fiber cable about 15 years ago. At the time the optical fiber cables were installed, it was expected that the optical fiber infrastructure would provide communications systems and networks with ample capacity for the foreseeable future. However, the phenomenal growth of data traffic on the Internet has taxed the capabilities of the optical fiber infrastructure. In addition, new high bandwidth applications are being developed and are being made available for corporate applications. The result of this increased usage of the fiber infrastructure is serious network congestion and exhaustion of the fiber infrastructure. In the past, optical fiber systems relied on time division multiplexing to route traffic through a channel. Time division multiplexed systems add more capacity by time multiplexing signals onto an optical fiber. A disadvantage of time division multiplex systems is that data must be converted from light waves to electronic signals and then back to light. The system complexity is thereby increased.

As the demand for increasing traffic capacity continues, the limitations of existing optical networks and optical communications systems must be overcome. To do so, the capacity of the existing optical networks and optical communications systems needs to be increased. Capacity of existing optical infrastructure may be expanded by the laying of more fiber optic cable, for example. However, the cost of such expansion is prohibitive. Therefore a need exists for a cost-effective way to increase the capacity of existing optical infrastructure.

Wavelength Digital Multiplexing (WDM) and Dense Wavelength Digital Multiplexing (DWDM) are being used and/or proposed for use in long-haul telecom network applications for increasing the capacity of existing fiber optic networks. The advantage of both WDM and DWDM is that the conversion to electrical signals is not necessary. The devices that handle and switch system traffic process light and not electrical signals. WDM and DWDM would appear to many to be the solution to optical network limitations. In WDM, plural optical channels are carried over a single fiber optic, with each channel being assigned to a particular wavelength. By using optical amplifiers, multiple optical channels are directly amplified simultaneously thereby facilitating the use of WDM systems in long-haul optical networks. DWDM is a WDM system in which channel spacing is on the order of one nanometer or less. WDM and DWDM expand the capacity of an optical fiber by multiple wavelength channels into a single laser beam. Each wavelength is capable of carrying as much traffic as the original.

Thus in one example set forth by Barry Greenberg in Special Report: new growth markets/emerging OEMs: lighting the way to a network-capacity solution, Electronic Buyer News, 04–19–1999, pp. 50, "A fiber carrying four 2.5-Gbit/s DWDM channels, for example, has its capacity increased to 10 Gbit/s, without having to install additional fiber of use higher-speed transmission equipment." With WDM and DWDM, traffic passes from one node of the network to its destination in the form of light waves without conversion to electrical signals. DWDM and WDM will permit increase in the capacity of the fiber infrastructure. Systems with up to 128 and 240 DWDM channels have been proposed and/or are being built. However, DWDM and WDM are both limited by the non-linear cost increase as the network is expanded. In each instance, expansion beyond an incremental increase in traffic handling capacity may trigger significant investment in new optical fiber and equipment that is significantly in excess of the incremental increase in network capacity. In addition, DWDM based systems are not scaleable in expansion because equipment typically has to be replaced rather than merely added to. Existing implementations of both WDM and DWDM are too limited for solving the congestion problems of the existing optical infrastructure. The present systems are limited in the number of available channels. The slight increase in channel occupancy in such systems will present severe restrictions on the traffic handling capacity of the network. Additional difficulties with present implementations of DWDM and WDM technology include lack of flexibility; difficulty in handling packet switched information, non-linear optical effects and the already noted lack of incremental and scaleable upgrade capability.

It is therefor highly desirable to provide an optical communication system that has increased channel capacity. It is further desirable to provide an optical communication system that provides bandwidth based upon user demand. It is further desirable that any improved optical communication system is able to utilize the existing fiber optic infrastructure. Such a solution will prevent so called "fiber exhaust". To effectively utilize the existing infrastructure in the face of the dramatic increases in traffic that will be encountered, it is highly desirable to increase channel capacity by a factor of 10 to 200 times that provided by DWDM to permit up to 20,000 channels to be served. It is also highly desirable that any improved optical communication system has a low cost per channel.

SUMMARY OF THE INVENTION

In a method of operating an optical communications system in accordance with the invention, a plurality of optical channels is provided and the optical channels are utilized for communications among a plurality of communications nodes. Each optical channel is determined by at least two of three optical signal characteristics. A first one of the optical signal characteristics is selected from a plurality of predetermined optical wavelengths. A second one of the optical signal characteristics is selected from a plurality of predetermined optical phases, and a third one of said optical signal characteristics is selected from a plurality of optical modulation frequencies.

In one embodiment in accordance with the principles of the invention, two of the optical signal characteristics are utilized to determine the optical channels. In this first embodiment of the invention, each channel is defined by one optical wavelength of a plurality of optical wavelengths and by one modulation frequency of a plurality of optical modulation frequencies.

In a second embodiment in accordance with the principles of the invention, one wavelength of a plurality of optical wavelengths, one frequency of a plurality of optical modulation frequencies, and one phase of a plurality of optical signal phases define each channel.

In a system in accordance with the principles of the invention, an optical network having a plurality of nodes, each node being coupled to the network, is provided with a laser source that serves as a reference to synchronize operation of the network. Still further in accordance with the principles of the invention, the reference laser optical output is distributed to all nodes of the network. In the illustrative embodiment of the invention, the reference laser output is distributed via a separate fiber optic path. By utilizing a distributed reference laser, a plurality of channels may be defined by.

In accordance with one aspect of the invention, the laser reference is used to generate a plurality of channels for communication paths through the network. In accordance with another aspect of the invention, the laser reference is a multiple wavelength laser.

Optical communication system apparatus and methods of operating an optical communications system in accordance with the invention may utilize existing optical fiber networks and provide significantly increased channel capacity. In accordance with one aspect of the invention the system apparatus provides for a plurality of communications channels and a processor unit receives requests for allocation of one or more channels from a node coupled to the optical communications system. The system apparatus dynamically allocates one or more channels selected from unused channels.

Still further in accordance with the invention, any node coupled to the communications system can be coupled to any other node via any unused channel. In accordance with one aspect of the invention, the selection of a channel is in accordance with a predetermined algorithm. One algorithm is such that the channel distance between the assigned channel and other channels in use is maximized. Another algorithm is such that cross channel interference between the assigned channel and channels in use is minimized.

BRIEF DESCRIPTION OF THE DRAWING

The invention will be better understood from a reading of the following detailed description in conjunction with drawing figures, in which like reference designations are used to identify like elements, and in which.

DETAILED DESCRIPTION

Optical networks are increasingly being utilized to support communication of various content between nodes. These optical networks form part of optical communication systems. These optical communication systems are, in some applications, characterized as "long-haul", "metro" and "short haul" networks. In "metro" network applications the bandwidth requirements of the networks has doubled every ten months. New communications applications require high bandwidth of the type found in Metro networks. However, the present traffic capacity of Metro networks is limited.

In accordance with the principles of the invention a solution to the problems with existing optical network and optical communication systems combines bandwidth and channel requirements into a single complete architecture.

One objective of the present invention is to be able to provide for bandwidth upgrade to the existing optical fiber networks and optical communications systems. In accordance with the present invention, increasing the available channel count and speed increases the bandwidth of existing optical networks. The number of concurrently available channels is increased over WDM systems by a factor of 10 to 200 permitting serving up to 20,000 channels simultaneously. As will be appreciated by those skilled in the art, the number of users that may be served by a multi-channel communications system is determined by the number of channels and an occupancy factor. In accordance with even a modest occupancy factor and bandwidth demand, the system of the present invention may be used to provide communications for in excess of 200,000 users concurrently. In addition, the system and method of the present invention provides for dynamic, on-demand bandwidth allocation and the capability of establishing communication between two random nodes, i.e., any node coupled to the communications system can communicate with any other node coupled to the communications system.

Figure 1:
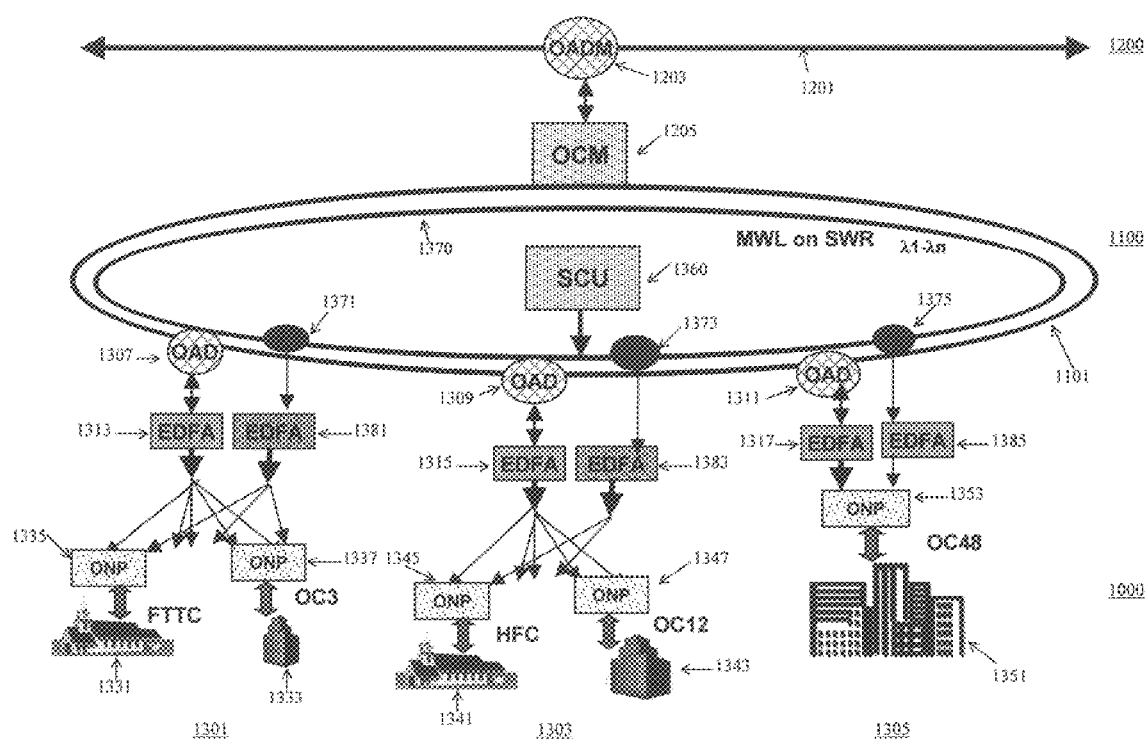
FIG. 1 depicts an optical communication system in accordance with the principles of the invention.

FIG. 1 depicts an optical communication system 1000 in accordance with the principles of the invention. Optical communication system 1000 includes a Metro Network 1100 coupled to a Long Haul Network 1200 via an optical add/drop module 1203 and optical cross connect module 1205. Metro Network 1100 couples one or more local access networks 1301, 1303, 1305 to each other and to Long Haul Network 1200. Long Haul Network 1200 interconnects plural Metro Networks 1100. For purposes of clarity in the drawings and simplicity in the description, only one Metro Network 1100 is shown. Metro Networks 1100 are typically located at widespread geographic locations. However, it is not intended to limit applicability of the present invention to arrangements in which networks are dispersed geographically. The present invention is applicable to networks that are overlapping in geographic areas or even to networks that are in the same geographic area.

Metro Network 1100 is, in the illustrative embodiment, depicted as a ring-based metropolitan network system. Metro Networks are intended to provide high bandwidth to end customers directly and/or via local loop access networks. In the illustrative embodiment depicted in FIG. 1, Metro Network 1100 is depicted as a ring based network having a fiber optic ring 1101. It will be understood by those skilled in the art that the invention is not limited to use in networks that are of a ring based structure. The principles of the invention are equally applicable to other network architecture structures including, not by way of limitation but by way of example, star network structures, mesh network structures, and point-to-point structures. For purposes of clarity and brevity, those additional network architecture structures are not shown in the drawing. In addition, although the illustrative embodiment of the invention depicts a Metro Network coupled to plural Access Networks 1300, the principles of the invention are not so limited. In addition, those skilled in the art will realize that the particular nomenclature used to describe the illustrative embodiment is also not intended to be limiting of the invention in any manner. For example, it is not intended to limit any aspect of the invention to so-called "Metro Network" applications. Those skilled in the art are familiar with the specific terminology utilized to describe the illustrative embodiment and will realize that the invention is applicable to other named communication systems and networks. For example, the principles of the present invention are applicable to "long haul" networks. Still further, the principles of the invention are not limited to optical communications systems utilizing only optical fiber for the communications paths. Those skilled in the art will recognize that various other terms may be used to describe or designate the identical or similar networks. For example, the term "long distance network" is also used in place of "long haul network".

Each Access Network 1301, 1303, 1305 is coupled to optical fiber ring 1101 of Metro Network 1100 via "add and drop nodes" referred to herein as optical add/drops (OADs) 1307, 1309, 1311, respectively. Optical add/drops in various forms are known to those skilled in the art. In its simplest form an optical add/drop is a coupler. Optical add/drops are used to add or extract optical signals. In the present invention, OADs 1307, 1309, 1311 are utilized to inject (add) and retrieve (drop) optical signals into and from optical fiber ring 1101. Both add and drop are bidirectional with respect to optical fiber ring 1101. By, "bidirectional" it is meant that optical signals may be transmitted in or received from either direction, i.e., to the right or to the left in the ring as shown, on optical fiber ring 1101. In addition, OADs utilized in the embodiment of the invention described herein provide broadband operation. An OAD particularly advantageously utilized in the embodiments of the invention is show in FIG. 26 and described in greater detail with respect to FIG. 26.

Each optical add/drop 1307, 1309, 1311 is, in turn, coupled to an optical fiber amplifier 1313, 1315, 1317. Optical fiber amplifiers 1313, 1315, 1317 may be of known design. In the illustrative embodiment of the invention the optical fiber amplifiers 1313, 1315, 1317 are each Erbium-doped amplifiers (EDFAs). EDFAs are the latest state-of-the-art solution for broad band amplification of optical signals in optical communication systems. EDFAs are commercially available from various sources. EDFAs overcome propagation losses of the optical signals through the optical fiber and boost the optical signals to necessary receiver levels. EDFAs can be used to amplify WDM and DWDM signals.

Access network 1301 includes a plurality of access locations or nodes that include a residential complex 1331 and a small office building 1333. Other access locations are not shown for clarity, but it will be understood that more than two access locations may be coupled into access network 1301. Furthermore, it will be understood by those skilled in the art that the various types of access locations or nodes shown are merely representative of the types of end users and are not intended in any way to limit the scope of the invention. The terms "node" and "access location" are used interchangeably herein. Each access location 1331, 1333, 1341, 1343, 1351 has associated with it an optical network processor 1335, 1337, 1345, 1347, 1353. The number of access locations 1331, 1333, 1341, 1343, 1351 that may be coupled into an access network 1301, 1303, 1305 is dependent upon the number of users and the traffic usage. Access network 1303 includes user complex 1341 and office building 1343 along with other locations that are not shown. Optical network processors 1345, 1347 are utilized to provide network access functionality for user complex 1341 and office building 1343, respectively. Access network 1305 includes large office complex 1351 and a single optical network processor 1353. It will be understood by those skilled in the art that the number of optical network processors 1335, 137, 1345, 1347, 135 associated with each access network 1301, 1303, 1305 may be more or less than the numbers shown in the drawing Figures. In operation, any user at any of the locations 1331, 1333, 1341, 1343, 1351 can utilize the communications system shown to access and exchange information with any other user in access networks 1301, 1303, 1305 or any other user coupled to Metro Network 1100 or to any user coupled to long haul network 1200. In addition to being able to couple any user to any other user coupleable to the communications system, the system of the invention can use any idle channel as a communications channel between any two users or nodes. This is identified as the random connection capability of the communications system of the invention.

In accordance with the principles of the invention, optical reference signals originating at a reference laser source are utilized to provide for channel synchronization and to permit a significant increase in the number of channels that are available for use in the system. In the illustrative embodiment of the invention, an additional ring is provided for the distribution of reference optical signals from a reference laser source. The additional ring serves to distribute reference optical signals throughout the Metro Network 1100 to all access networks 1301, 1303, 1305. The reference laser source is, in the illustrative embodiment, co-located with a system control unit 1360. The reference optical signals are distributed via a ring network 1370. The reference optical signals are coupled to each access network 1301, 1303, 1305 via an optical coupler 1371, 1373, 1375, respectively. The optical output of each coupler 1371, 1373, 1375 is distributed to each optical network processor via an optical amplifier 1381, 1383, 1385. As will be apparent to those skilled in the art, although the structure depicted in the illustrative embodiment of the invention is shown as a ring type distribution, the invention is equally applicable to other distribution structures such as, not by way of limitation but by way of example, star, mesh or point-to-point distribution arrangements. Furthermore, the distribution structure for the reference signals does not have to correspond to the structure of the network. That is, because a ring distribution structure is used in the communications system, a ring distribution structure does not have to be used with the reference optical signal distribution, other distribution structures may be used including hybrid combinations of various distribution arrangements.

Figure 2:
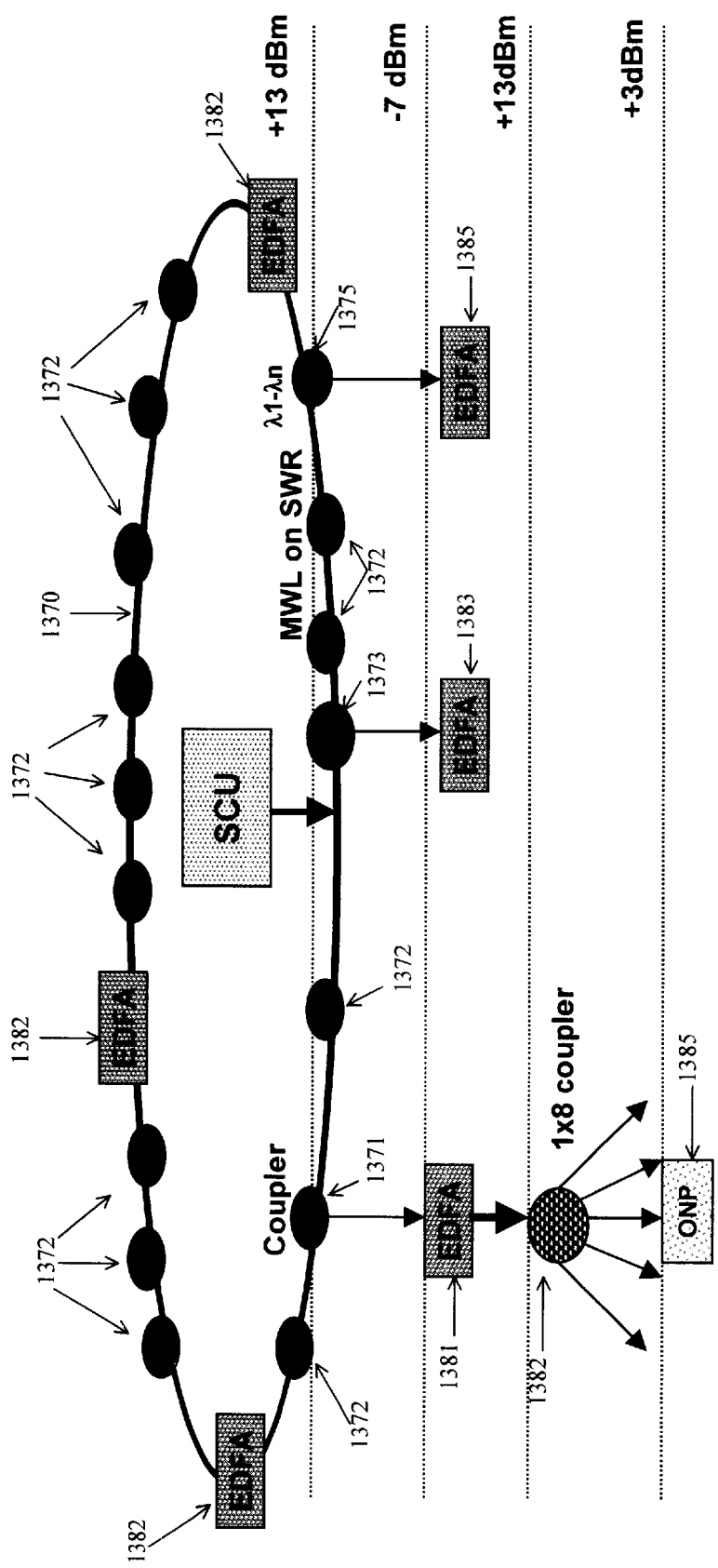
FIG. 2 depicts representative optical signal power distribution levels in a portion of the system of FIG. 1.

The reference laser source utilized in the illustrative embodiment includes a multiple wavelength laser. To assure adequate optical power levels are provided to each node coupled to the access networks 1301, 1303, 1305, a distribution network and power allocation arrangement is provided as shown in FIG. 2. System control unit 1360 has co-located therewith a reference laser source 1362. Optical reference signals from reference laser source 1362 arc coupled to optical fiber ring 1370. Additional optical couplers 1372 are shown to indicate that additional access networks may also receive optical reference signals. In network 1370 additional optical amplifiers 1382 are employed to maintain a power level of +10 dBm for each wavelength. At the output of optical couplers 1371, 1373, 1375 the power level is a +0 dBm. Optical amplifiers 1381, 1383, 1385 raise the power level to +13 dBm.

The output of each optical amplifier 1381, 1383, 1385 may be distributed at the access network level to one or more optical network processors, such as optical network processor 1335. Optical couplers, such as optical coupler 1384 provide this distribution. Optical coupler 1384 couples the output of amplifier 1381 to up to eight optical network processors, such as optical network processor 1335. The power level for each wavelength of the reference laser signal at the input to the optical network processor 1335 is maintained at +3 dBm. By use of optical amplifiers 1381, 1383, 1385 and amplifiers 1382 disposed in the reference laser ring network 1370, uniform useable reference laser signals are made available at each optical network processor. Although specific signal levels are shown in the illustrative embodiment of FIG. 2, those signal levels are intended to indicate how distribution of optical reference signals at adequate levels may be provided and is not intended to be limiting any way.

In a first embodiment of the invention, a multiple wavelength laser is utilized to provide a reference optical signals for generation and assignment of optical channels that are determined from selecting for each channel one wavelength of a plurality of optical wavelengths and one frequency of a plurality of optical modulation frequencies. In the illustrative system, the number of wavelengths that are obtainable from a multiple wavelength laser source is M wavelengths, where M is 32. The number of optical modulation frequencies is O, where O is 128. Thus the system of the first embodiment of the invention has a channel capacity of 32×128=4096 channels. Each channel in the system of the illustrative embodiment has a bandwidth of 155 mbs. In other embodiments of the invention higher or lower speed and bandwidths may be used. Also, in other embodiments of the invention, different numbers of channels, different numbers of wavelengths and different numbers of optical modulation frequencies nay be utilized.

Figure 3:
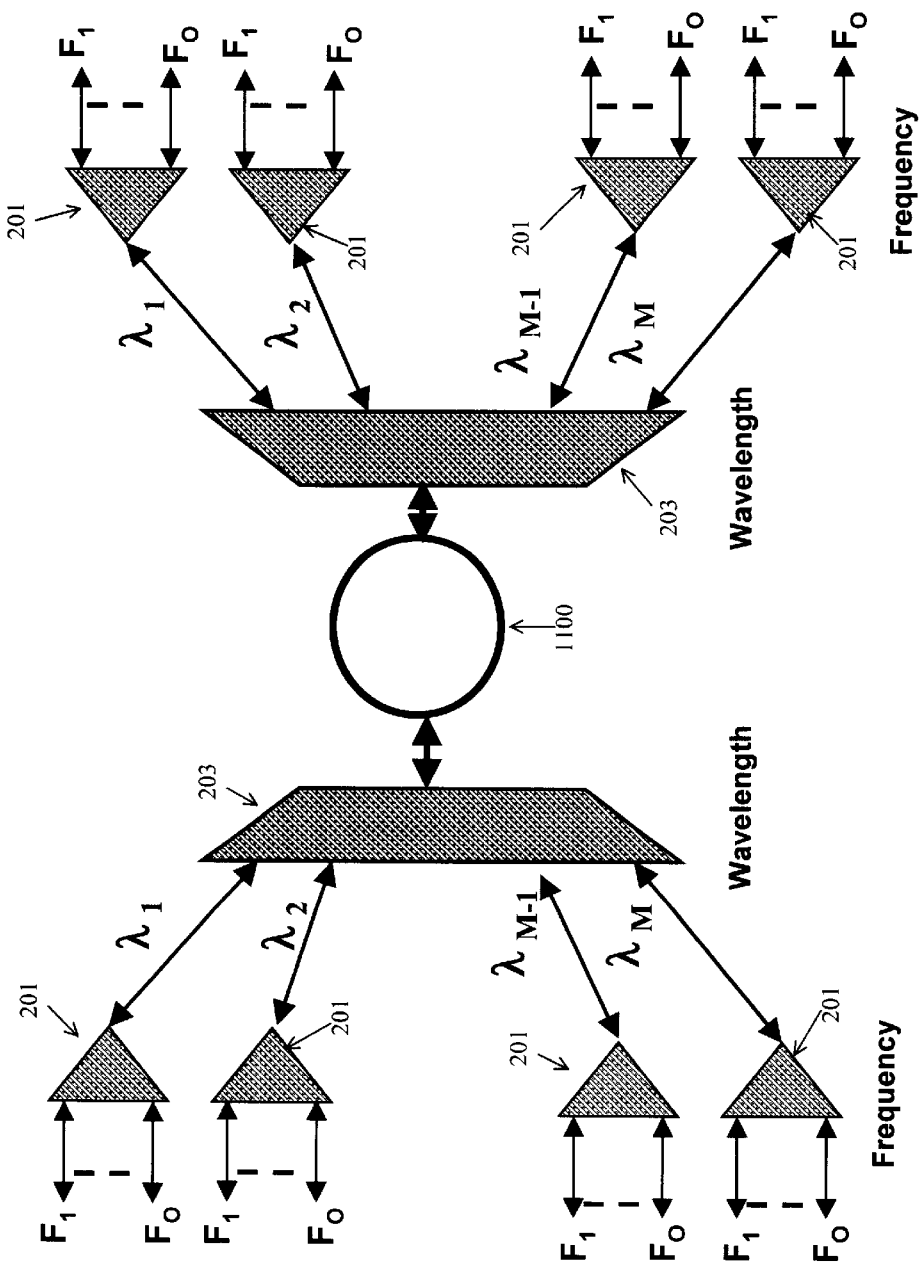
FIG. 3 illustrates multiplexing of optical signals in accordance with the principles of the invention.

Turning to FIG. 3, the functionality of multiplexing and switching channels identified by wavelength and frequency is illustrated. For each wavelength, $\lambda_1$ through $\lambda_M$, frequencies $F_1$ through $F_O$, are multiplexed by multiplexor/demultiplexors 201. The frequency multiplexed wavelengths at the outputs of multiplexors 201 are multiplexed together at wavelength multiplexor/demultiplexor 203. The multiplexed optical output of multiplexor/demultiplexor 203 is coupled to optical network 1101. The multiplexor/demultiplexor functions are changed to demultiplexing for received optical signals. The optical signals received over optical network 1101 are first wavelength demultiplexed by multiplexor/demultiplexor 203 to wavelengths $\lambda_1$ through $\lambda_M$. For each wavelength, a multiplexor/demultiplexor 201 demultiplexes the frequencies $F_1$ through $F_O$. The multiplexor/demultiplexor 201, 203 provide switched multiplexing. For example, multiplexor/demultiplexor 203 to the left in FIG. 3 can switch any number of wavelengths onto optical network 1101

Figure 4:
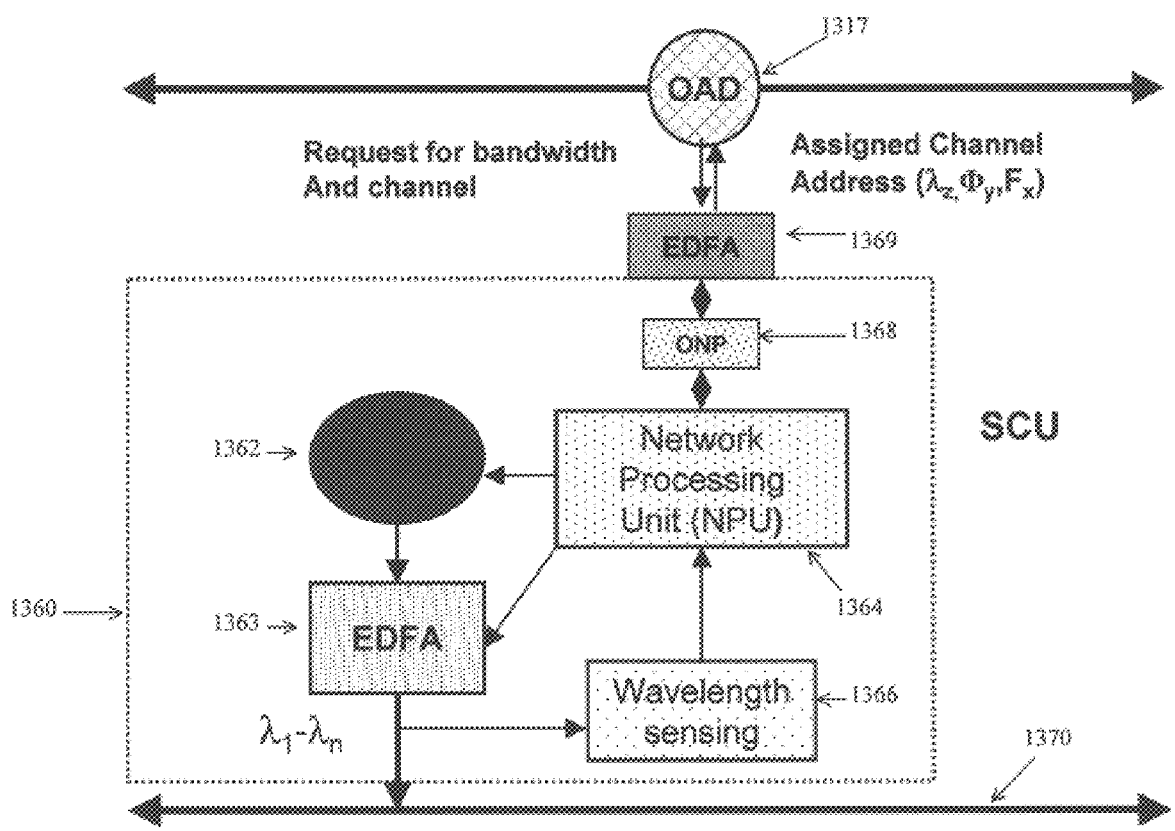
FIG. 4 is a block diagram of a system control unit in the system of FIG. 1.

FIG. 4 illustrates a system control unit 1360 in block diagram form. System control unit 1360 includes multiple wavelength laser 1362 that is coupled to optical amplifier 1363. Optical amplifier 1363 couples wavelength laser 1362 to laser reference ring network 1370. A network processing unit 1364 is provided to control and monitor operation of the supply of reference optical signals to the reference ring network 1370. A wavelength sensing circuit 1366 is coupled to the output of optical amplifier 1363. Optical amplifier 1363 provides sensing signals to network processing unit 1364 that permit network processing unit 1364 to adjust the output level of optical amplifier 1363 and to control multiple wavelength laser 1362. Network processing unit 1364 is coupled to network 1100 via an optical network processor 1368, an optical amplifier 1369 and an optical add/drop 1317. Network processing unit 1364 receives requests for bandwidth and channel assignments from nodes coupled to the network 1101 and responds with the address of one or more allocated channels. The number of channels allocated to a node depends upon the bandwidth needed for handling the traffic. Network processing unit 1364 includes one or more processors and associated memory. The processor units may be commercially available processors. Memory associated with the processor unit or units may be any commercially available memory. Programs stored in memory are utilized to control the operation of network processing unit 1364.

Figure 5:
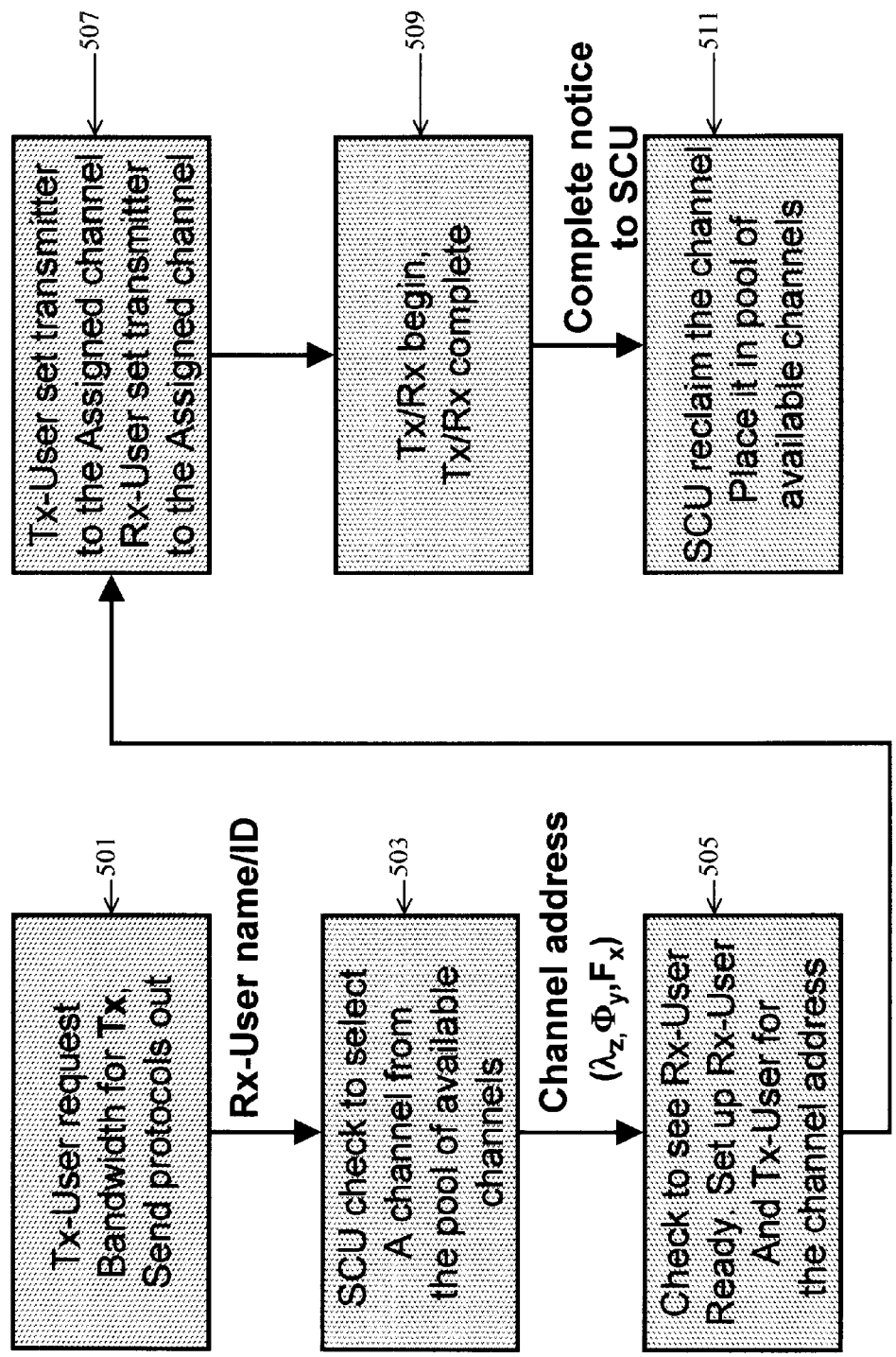
FIG. 5 is flow chart illustrating channel assignment in accordance with the invention.

Operation of system control unit 1360 in processing requests for channel assignments is shown in FIG. 5. System control unit 1360 constantly identifies which channels have been allocated and which channels are idle. System control unit 1360 responds dynamically to requests for channels by selecting channels from the idle channels and allocating the channels as needed. When communication between users over a channel is complete, the channel is returned to the designated idle channel pool. In the illustrative embodiment of the invention, system control unit 1360 selects an idle channel to achieve maximum isolation with used channels, i.e., the channel is selected to have the maximum separation from channels in use. In other embodiments of the invention, the manner in which channels are selected may utilize a selection algorithm or a weighting selection or other scheme for channel assignment. In operation, a system node that needs to transmit information via the network 1100 transmits a request to system control unit 1360 as indicated at step 501, for a channel. The request also identifies the destination node or nodes. After receiving the request, network processing unit 1364 selects a channel from the pool of available channels, as indicated at step 503. The channel address is assigned. Wavelength and frequency identify the channel address. At step 505, network processing unit 1364 provides the designated channel identity to the transmitting node and to the receiving node. Network processing unit 1364 identifies the assigned channel as in use at step 507. Transmission and reception of information occurs at step 509. Upon completion of transmission by transmitting node, network processing unit 1364 reclaims the channel and again assigns it to the pool of available channels at step 511. Communication of channel assignments to system nodes may be accomplished in any one of a number of conventional channel assignment methods. In the illustrative embodiment of the invention, communication of channel assignments to nodes from SCU 1360 and from node to SCU 1360 is accomplished by use of dedicated control and communication channels.

Figure 6:
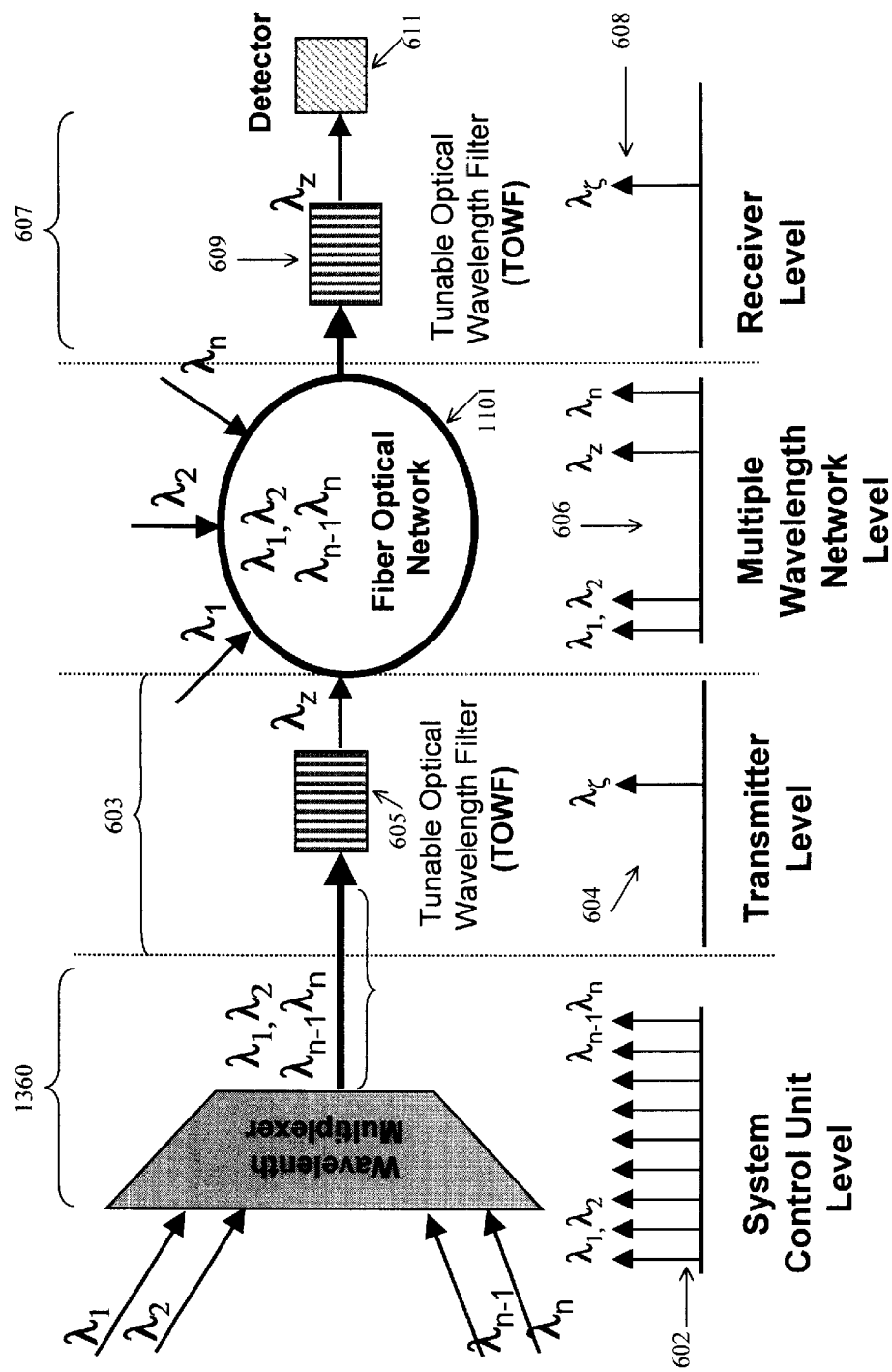
FIG. 6 is illustrates the wavelength multiplexing utilized in the system of FIG. 1.

FIG. 6 illustrates the operability o f the multiplexing and switching provided in improved network of the invention. In FIG. 6, an optical fiber network such as network 1101 is illustrated as a ring. At the system control unit 1360, multiple wavelengths optical signals, $\lambda_1$ through $\lambda_M$, are multiplexed together and distributed via reference laser ring network 1370 to network nodes. Chart 602 indicates the wavelengths that are available on reference laser ring network 1370. A network node, identified as node 603 has requested that a channel be assigned. System control unit 1360 allocates a channel. The allocated channel includes wavelength $\lambda_Z$. At network node 603, a tuned optical wavelength filter 605 is utilized to select the wavelength $\lambda_Z$ assigned by the system control unit 1360. Filter 605 couples optical channel signals at the wavelength $\lambda_Z$ over the optical fiber network 1101. Chart 604 indicates that the output of the output of node 603 presented to network 1101 is a single wavelength. Other nodes likewise transmit different wavelength channels over the network 1101 as indicated by the additional inputs to optical fiber network 1101. Wavelength chart 606 illustrates that although each node nay provide an optical signal at a single wavelength, optical fiber network 1101 carries multiple wavelengths. System control unit 1360 has informed node 607 that it is assigned to receive communications from node 603 at wavelength $\lambda_Z$. At a node 607, a tunable optical wavelength filter 609 is adjusted to select wavelength $\lambda_Z$ and provide the signal to a detector 611 that is used to extract information carried by the optical signals. Chart 608 indicates that the output of tunable optical wavelength filter 609 provides a single wavelength output. Tunable output wavelength filters 605, 609 may be of a design described in the literature.

In a second embodiment of the invention, advantageous use is made of the properties of optical signals to further enhance the channel capacity of optical communication systems. A phase modulated optical signal may be characterized in terms its wavelength $\lambda$, its phase $\phi$, and its modulation frequency f. Recognizing this, the second embodiment of the invention utilizes phase modulated and delayed optical signals and defines each optical channel by a wavelength multiplex, a phase delay or coherence multiplex and a frequency multiplex. In the second illustrative embodiment of the invention, the number of wavelength multiplexed is identified as "M". The number of phase or coherence multiplexed channels is identified as "N". The number of frequency multiplexed channels is "O". With M=32, N=8, and O=64, the number of available channels that may be multiplexed together is 32×8×64 or 16,000 channels. Each channel has a bandwidth of 155 mbs. Thus the total bandwidth is 16,000 channels×155 mbs=2.5 tbs. In other embodiments of the invention higher or lower speed and bandwidths may be used. Also, in other embodiments of the invention, different numbers of channels, different numbers of wavelengths and different numbers of optical modulation frequencies may be utilized.

The architecture of the second embodiment of the invention is the same as shown in FIGS. 1 and 2. The system control unit 1360 as shown in FIG. 4 and its operation as set forth with respect to FIG. 5 are substantially the same in the second embodiment. The system and method of the second embodiment of the invention utilize a phase multiplex/switch layer, a frequency multiplex/switch layer and a wavelength multiplex layer in addition to the wavelength multiplex/switch layer described in conjunction with FIG. 6.

The phase multiplex/switch layer makes advantageous use of the fact that a single wavelength optical signal in optical fiber can carry multiple phases. At the transmission end phase separation is provided through delay of the channel with respect to the reference channel. By creating a phase delay that is larger than the coherence length of the laser, multiple phase channels can be multiplexed into a single wavelength At the receive end, phase recovery is provided. By reversing the phase delay and interfering with the reference signal, the phase-multiplexed channel can be separated and detected with an interferometer.

Figure 7:
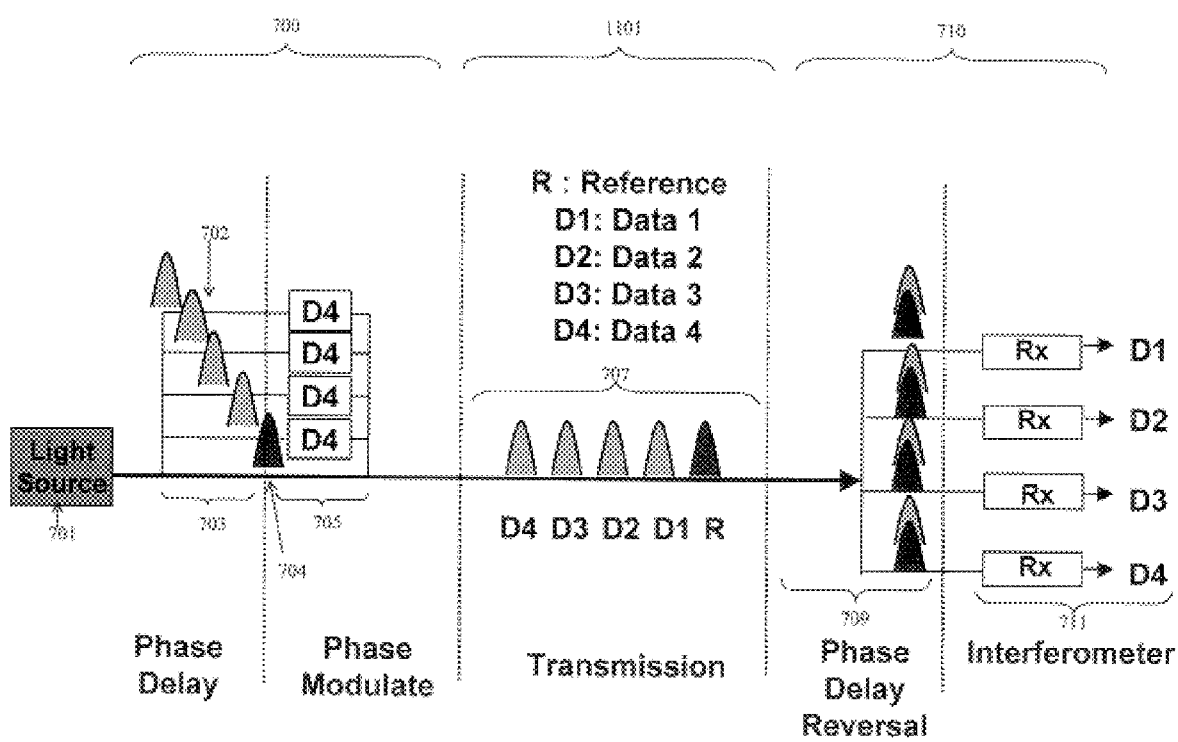
FIG. 7 illustrates use of interferometer technology in an embodiment of the invention.

Turning to FIG. 7, the manner in which interferometer technology may be utilized to provide phase multiplex/switching is illustrated. In the illustration, four phase channels are illustrated. It will be understood by those skilled in the art that the number of phase channels shown in FIG. 7 is merely illustrative and is not to in any way be considered as limiting. In FIG. 7, the transmit end is illustrated at 700 and the receive end is illustrated at 710. Interconnecting transmit end 700 and receive end 710 is the optical fiber network 1101. Light source 701 generates optical signals. Phase delays are created as shown at 703 to produce four phase multiplexed data channels. The undelayed optical signal 704 provides a reference. The phase delayed signals 702 are phase modulated at 705 to encode data onto the signals. The phase delayed optical signals appear on the optical network 1101 as shown at 707. At receive end 710, a phase delay reversal is provided at 709. By utilizing reference signals the phase multiplexed reference signal is demultiplexed. Interferometer techniques 711 are utilized to demodulate and decode the data that was transmitted via the optical signals.

In the phase interferometer multiplex/switching portion, signals are detected by interferometer based on phase amplitude, not by intensity, to get better sensitivity. Amplifiers can compensate for system losses thereby leading to a system that tolerates more loss. In addition, by providing signals in difference phases, multiple wavelength channels are carried in the same wavelength. Switching between phase channels can be done electro-optically within less than 0.1 microsecond to allow for fast packet switching. Channel isolation is enhanced by properly selecting phase, wavelength and modulation frequency.

Figure 8:
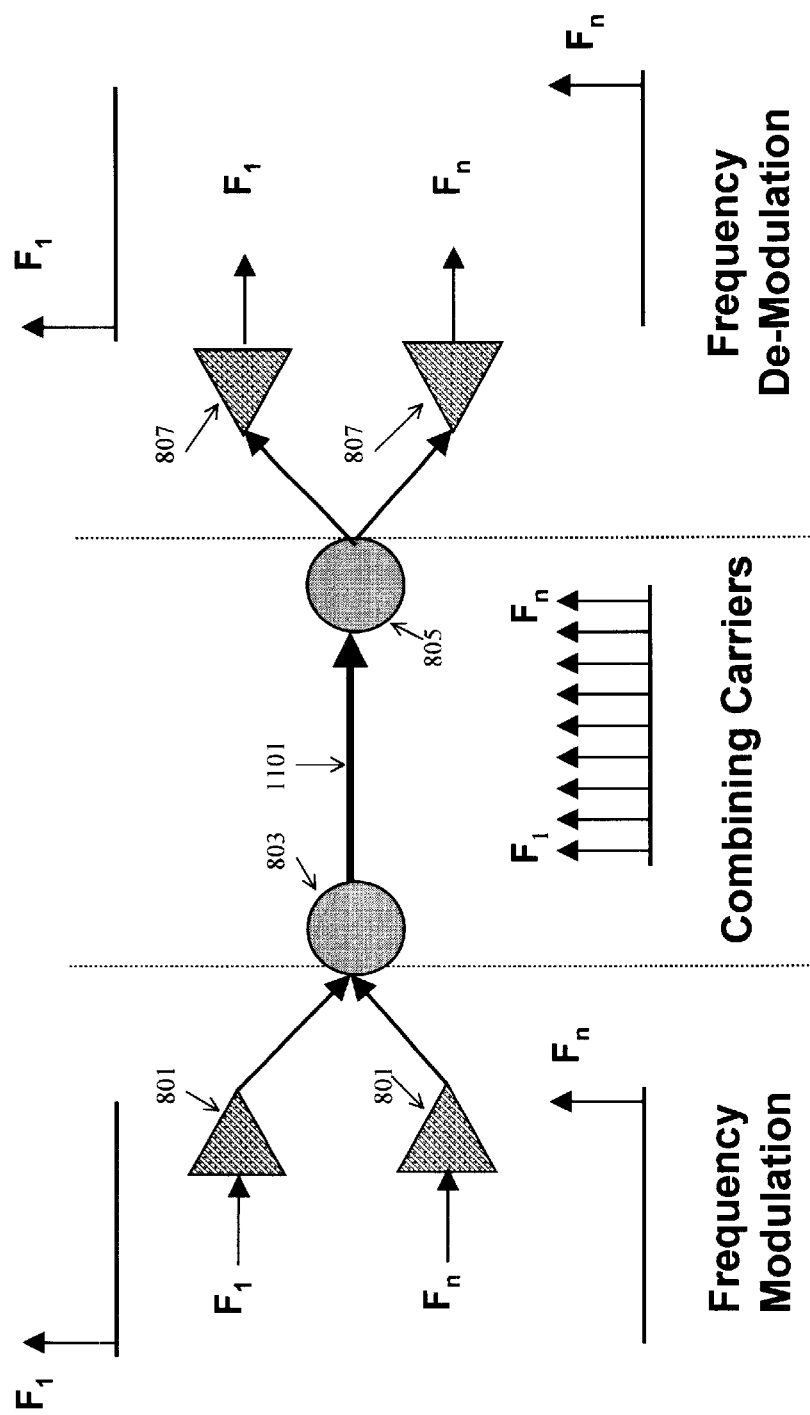
FIG. 8 illustrates a frequency multiplex/switch layer implementation utilized in an embodiment of the invention.

FIG. 8 illustrates the frequency multiplex/switch layer implementation utilized in the invention. In the illustrative embodiment, O optical frequencies, $F_1$ through $F_O$, are utilized as carriers. Modulators 801 produce modulated optical signals at the individual optical carrier frequencies, $F_1$ through $F_O$. Combiner 803 combines the individual carrier frequencies onto the optical network 1100. As illustrated in spectral chart 804, combiner 803 combines all the carrier frequencies onto the network optical fiber 1101. At the receive end a divider 805 separates the frequency component, $F_1$ through $F_O$. Demodulators 807 demodulate the optical signals.

Figure 9:
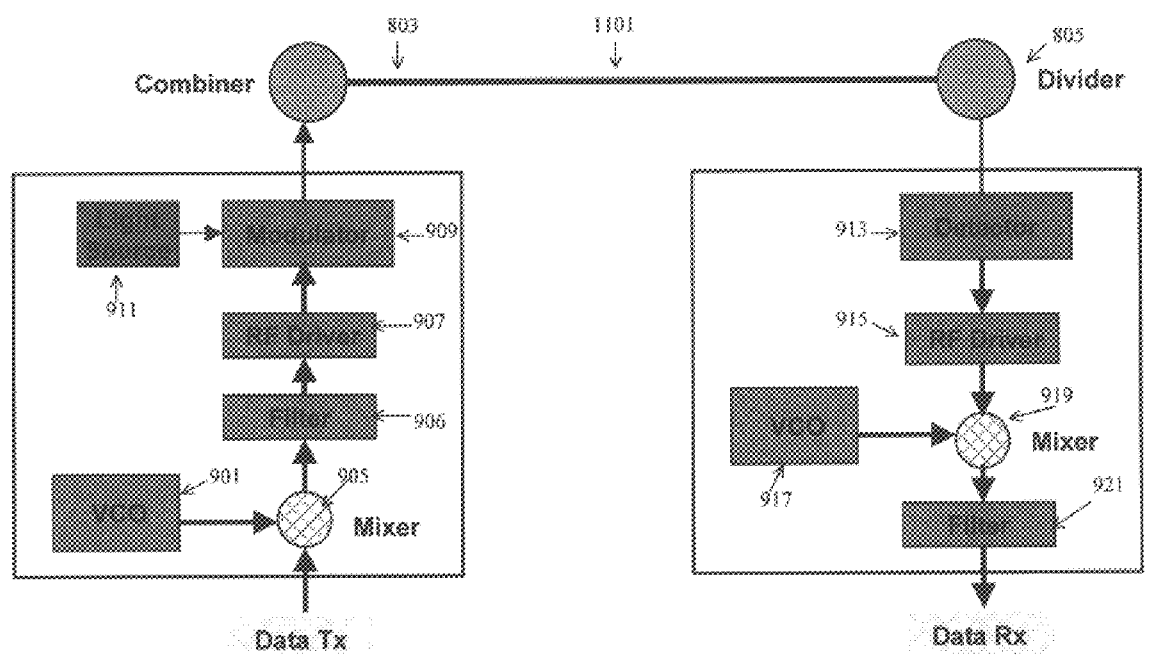
FIG. 9 illustrates in block diagram form a frequency modulator and frequency demodulator for use in a system in accordance with the invention.

FIG. 9 illustrates in block diagram form a modulator 801 and a demodulator 807. Data 903 to be transmitted is combined in a mixer 905 with an TF signal produced by a RF source 901. The resulting RF signal is applied to a RF driver filter 907 that provides appropriate filtering and driver buffering. The output or RF driver filter 907 is supplied to modulator 909 to modulate an optical signal from a light source 911. The optical signal from light source 911 is modulated by an RF signal at the modulation frequency corresponding to the channel assigned for communication to the node at which the modulator 801 is located. At the receiver node that is intended to receive data from the node at which modulator 801 is located, demodulator 807 receives optical signals. Demodulator 807 includes a detector circuit 913. Detector circuit 913 is set to detect optical signals at the channel frequency designated for communication from the node at which modulator 801 is located. The output of detector 913 is coupled to a RF driver filter 915. The output of the RF driver 915 is combined with an TF signal provided by RF source 917 in a mixer 919 to recover the transmitted data at terminal 921. The TF signal is at the modulation frequency assigned to the particular channel.

Figure 10:
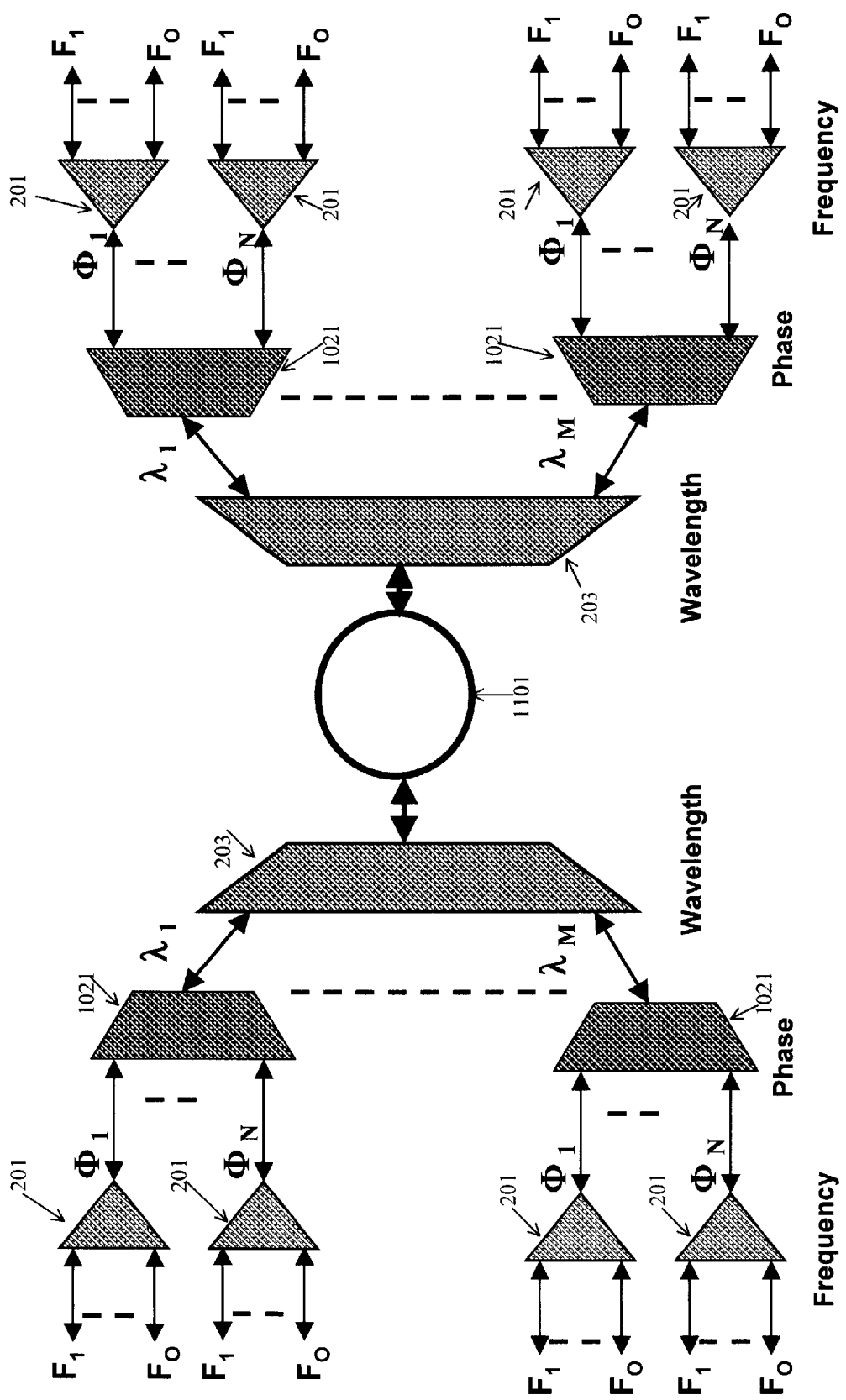
FIG. 10 illustrates the multiplexing of signals in a second embodiment of the invention in accordance with the principles of the invention.

Turning to FIG. 10, the functionality of multiplexing and switching channels identified by wavelength, phase and frequency is illustrated. For each phase, $\phi_1$, through $\phi_N$, of each wavelength, $\lambda_1$ through $\lambda_M$, Frequencies $F_1$ through $F_O$, are multiplexed by multiplexor/demultiplexors 201. The frequency multiplexed signals for each of the phases at the outputs of multiplexors 201 are multiplexed together at phase multiplexor/demultiplexors 1021. The frequency and phase-multiplexed signals for each wavelength are applied to wavelength multiplexor/demultiplexor 203. The multiplexed optical output of multiplexor/demultiplexor 203 is coupled to optical network 1101. The multiplexor/demultiplexor functions are changed to demultiplexing for received optical signals. The optical signals received over optical network 1101 are first wavelength demultiplexed by multiplexor/demultiplexor 203 to wavelengths $\lambda_1$ through $\lambda_M$. For each wavelength, a corresponding phase multiplexor/demultiplexor 1021 demultiplexes phases and for each phase a multiplexor/demultiplexor 201 demultiplexes the frequencies $F_1$ through $F_O$. Each multiplexor/demultiplexor is bi-directional in that it will switch or multiplex one or more signals into a single stream and that it will demultiplex or switch signals out of a combination stream.

Since each channel has a unique wavelength, phase and modulation frequency correlation, it can be identified by a unique address that references its wavelength, phase and frequency. For M wavelengths, N phases, and O modulation frequencies each channel may be particularly identified by a channel identity in which the wavelength is assigned a number of from 1 to M, each phase is assigned a number of from 1 to N and each modulation frequency is assigned a number from 1 to O. The channel identity for each channel may be referred to as $\lambda_m \Phi_n f_o$, where "m" is the wavelength number, "n" is the phase number and "o" is the frequency number. This channel identity is selected for convenience and clarity in description only and is not in any way intended to limit the invention.

Figure 11:
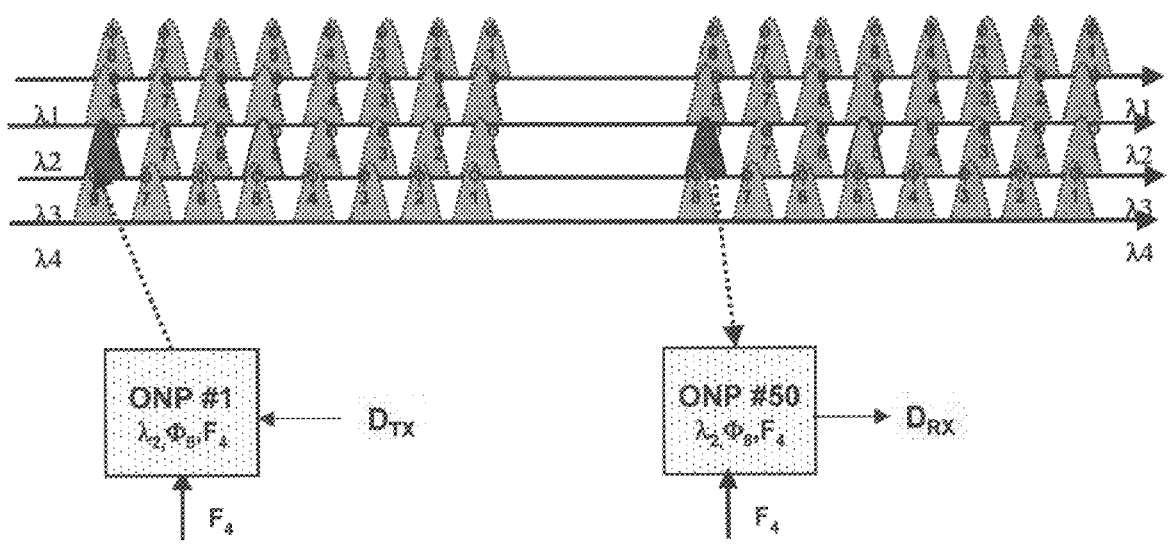
FIG. 11 illustrates, in simplified form, the transmission of data from one network node to a second network node.
Figure 12:
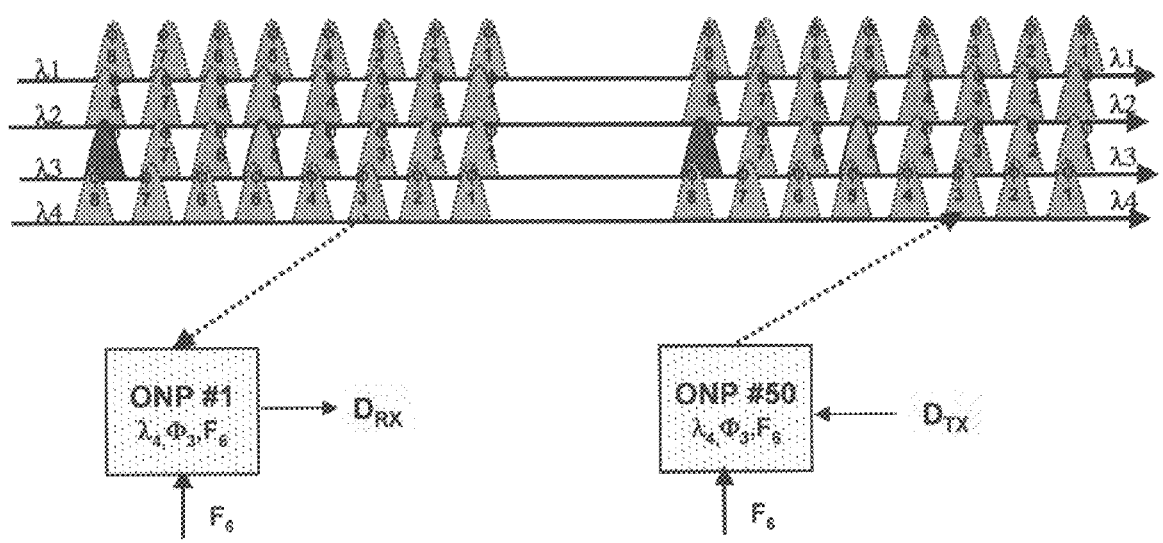
FIG. 12 illustrates, in simplified.form, the transmission of data from the second network node to the first network node of FIG. 11.

FIGS. 11 and 12 illustrate the exchange of data between two network nodes as represented by optical network processors ONP#1 and ONP#50. Initially, ONP#1 request a channel allocation from system control unit 1360. System control unit 1360 makes the selection of an idle channel and as a result allocates a channel identified as $\lambda_2 \phi_8 F_4$ for transmission of data from ONP#1 to ONP#50. As shown in FIG. 11, ONP#1 inserts data. $D_{TX}$ into the designated channel. ONP#50 receives the modulated signal and extracts the data $D_{RX}$. Upon completion of the data transmission to ONP#50, system control unit 1360 returns the channel assignment of channel $\lambda_2 \phi_8 F_4$ to the pool of unassigned channels for reassignment. Later, the node at which ONP#50 is located requests a channel assignment from system control unit 1360. System control unit 1360 assigns a channel form the pool of available idle channels. In this instance channel $\lambda_4 \phi_3 F_6$ is assigned, ONP#50 transmits and ONP#1 receives data in the assigned channel. Upon completion of the data transmission, the channel is reassigned by system control unit 1360 to the pool of idle channels.

Figure 13:
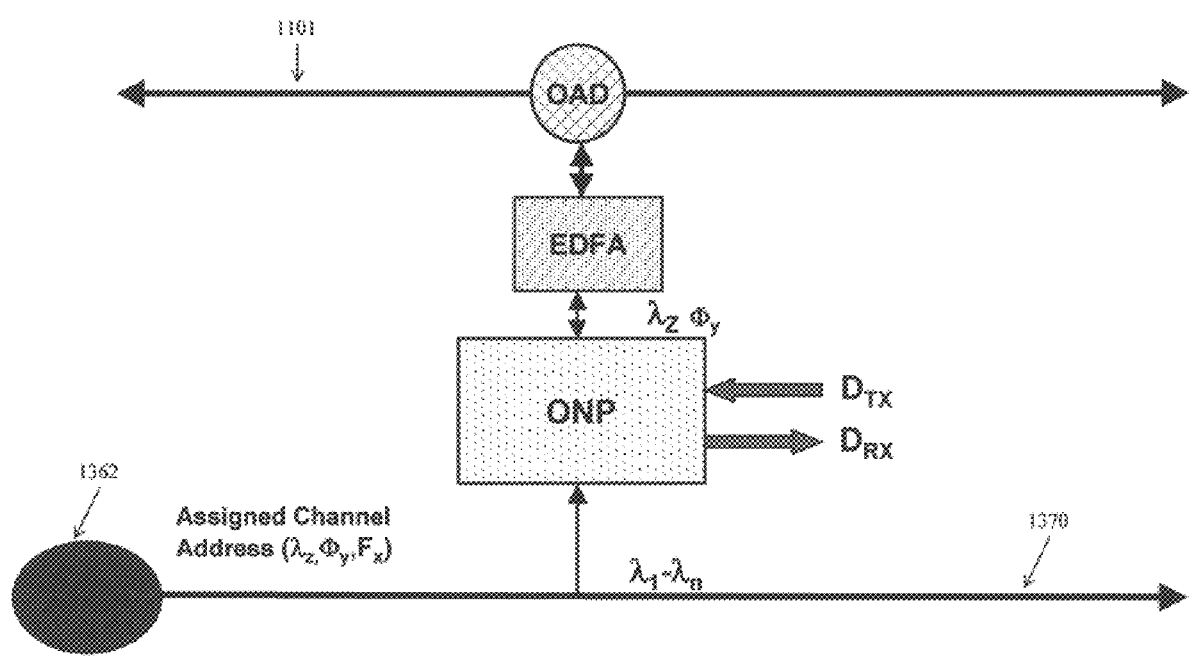
FIG. 13 is a block diagram of a network node in accordance with the invention.

As shown in FIG. 13, each network node includes an optical network processor ONP that includes a modulator and a demodulator as described above. Each ONP is coupled to the laser reference source 1362 via the laser reference network 1370 as shown in FIG. 1. Each ONP is coupled to the optical fiber network 1101 via an optical add/drop OAD and an optical amplifier EDFA.

Optical Network Processor

Figure 14:
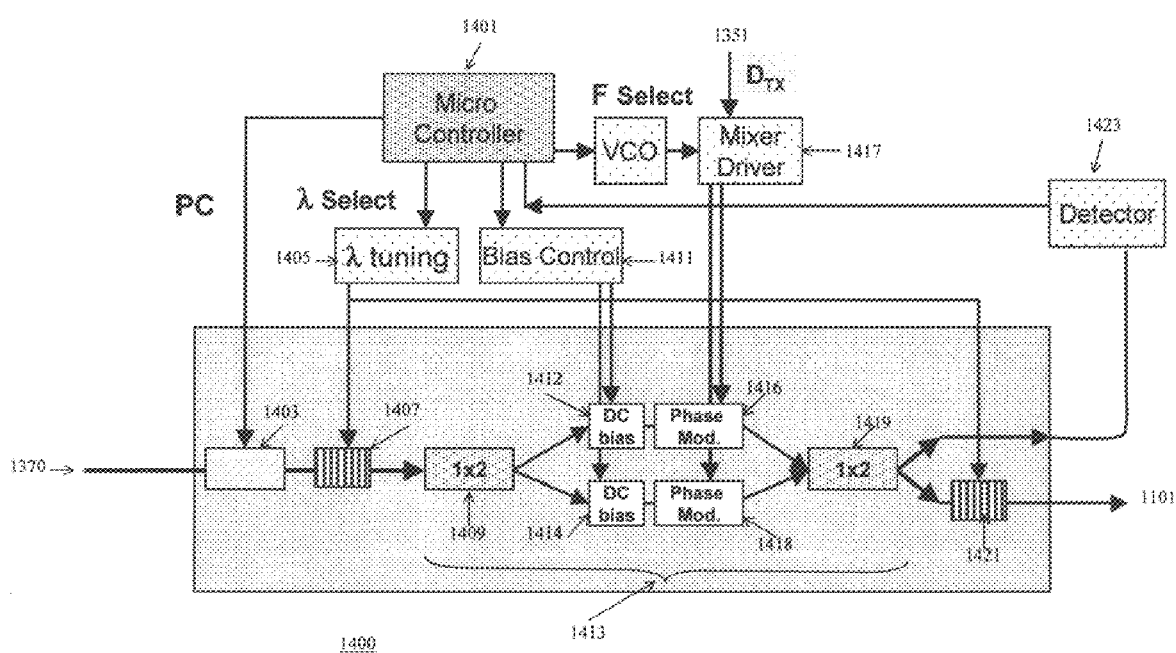
FIG. 14 is a detailed block diagram of a portion of a first optical network processor (ONP) for use with an embodiment of the invention.
Figure 15:
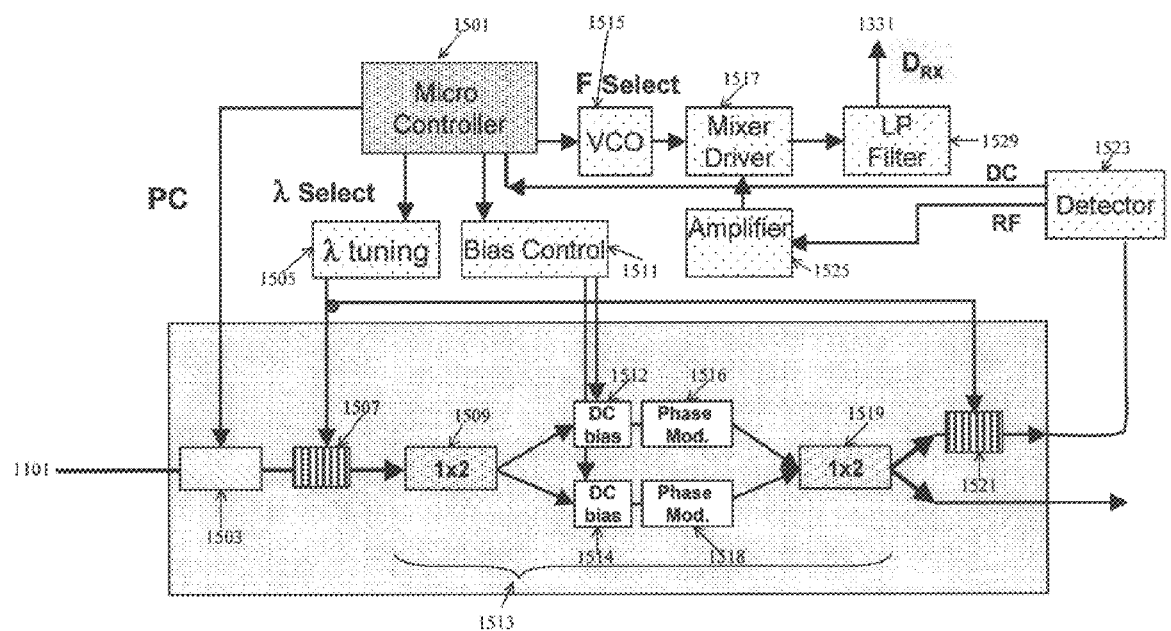
FIG. 15 is a detailed block of a second portion of the first optical network processor useable in conjunction with the optical network processor portion of FIG. 14.
Figure 16:
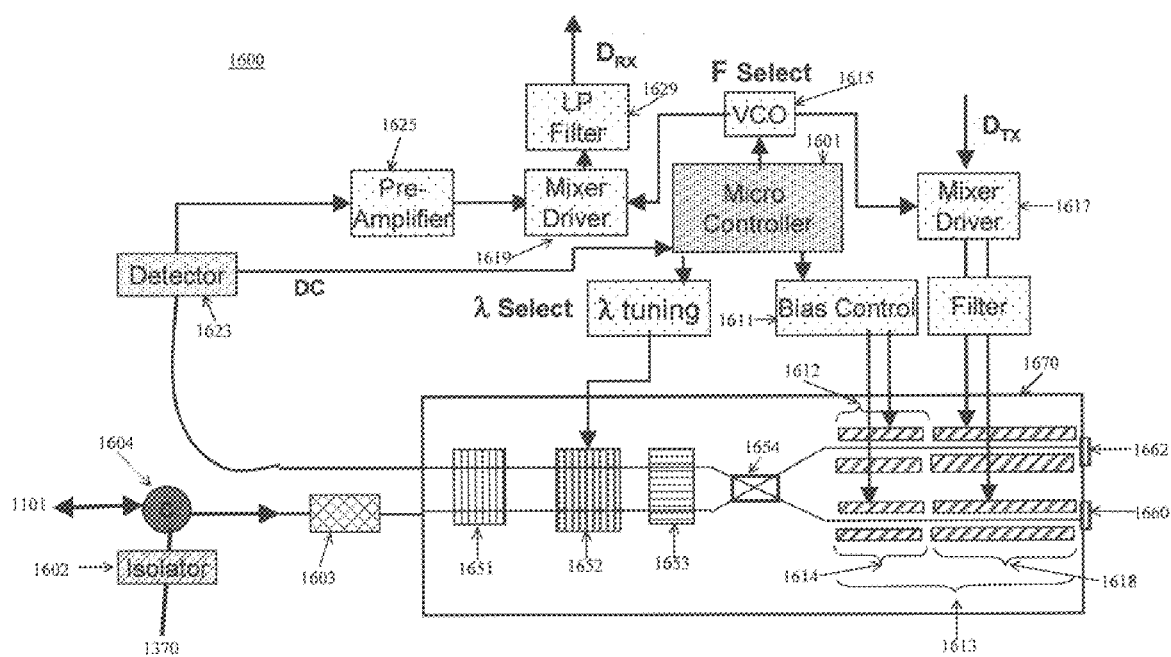
FIG. 16 is a detailed block diagram of a second optical network processor.
Figure 17:
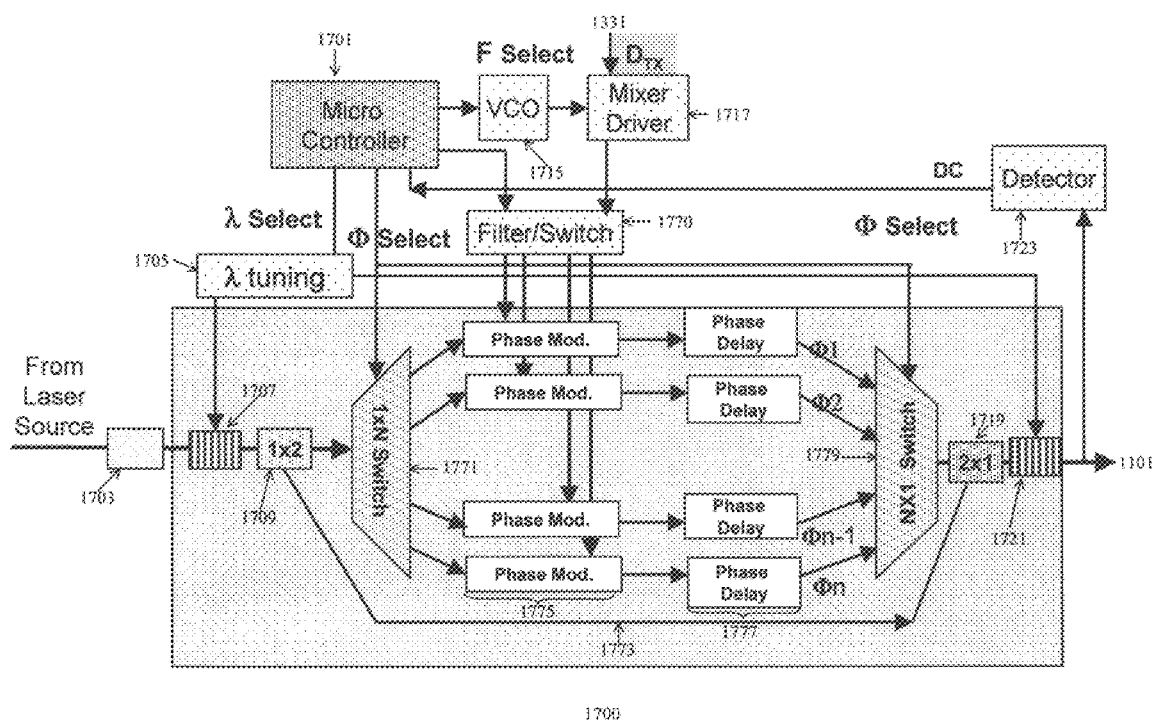
FIG. 17 is a detailed block diagram of a first portion of a third optical network processor for use with the second embodiment of the invention.

FIGS. 14 and 15 depict a transmitter portion and a receiver portion of an optical network processor particularly well adapted for use with the above-described first embodiment of the invention. FIGS. 16 and 17 depict a transmitter portion and a receiver portion of an optical network processor particularly well adapted for use with the above-described second embodiment of the invention.

Each optical network processor includes a transmit function and a receive function. The receive function decodes data from a systems communications channel assigned for communications to a node coupled to the optical network processor to control the associated wavelength multiplex/switch, phase multiplex/switch and frequency multiplex/switch. The transmit function converts data from an associated node to an assigned system communications channel by controlling the associated wavelength multiplex/switch; phase multiplex/switch and frequency multiplex/switch.

Turning to FIG. 14, a transmitter portion of an optical network processor for use in a first embodiment of the invention is shown. Transmitter portion 1400 of an optical network processor includes one or more processors or micro controllers 1401 that provides program control of operation of the optical network processor. For clarity only one processor is shown for each optical network processor, but more than one processor may be used. Transmitter portion 1400 is coupled to laser reference network 1370 and receives signals from the multiple wavelength signals from laser reference source 1360. A polarization controller 1403 under control of micro controller 1401 selects polarization of the received laser signals. The output of polarization controller 1403 is coupled to tunable filter 1407. In an alternate embodiment of the invention, a depolarizer replaces polarization controller 1403. Micro controller 1401 receives channel allocation information and utilizes the channels allocation information to select a wavelength and frequency for its associated node to transmit data. Micro controller 1401 via wavelength tuning module 1405 operates tunable filter 1407. Wavelength tuning module 1405 selects a wavelength in response to micro controller 1401 providing a wavelength select signal. Tunable filter 1407 is tuned to the selected wavelength. Tunable filter 1407 thereby selects the wavelength optical signal for transmitting data under control of micro controller 1401. The output of tunable filter 1407 is coupled to a Mach-Zehnder interferometer 1413. Interferometer 1413 includes two legs coupled at the input to a coupler 1409 and at the output by coupler 1419. A first leg includes dc bias module 1412 and a phase modulator 1416. A second leg includes dc bias module 1414 and a phase modulator 1418. Microcontroller 1401 provides quadrature control of interferometer 1413 via bias control module 1411. Quadrature control ensures stable linear operation of the interferometer 1413. Frequency selection is provided via microcontroller 1401 controlling voltage-controlled oscillator 1415 that in turn provides a selected modulation frequency to mixer/driver module 1417. Mixer/driver module 1417 mixes the modulation frequency output of voltage controlled oscillator 1415 with Transmit data $D_{TX}$. The outputs of interferometer 1413 are provided to tunable filter 1421 which is tuned by wavelength tuning module 1405 to the wavelength selected by micro controller 1401. The output of tunable filter 1421 is coupled to network 1101. In addition, coupler 1419 has an output coupled to photo detector 1423. The output of photo detector 1423 is coupled to micro controller 1401.

FIG. 15 depicts optical network processor receive portion 1500. Receive portion 1500 of an optical network processor includes a processor or micro controller 1501 that provides program control of operation of the optical network processor. Receive portion 1500 is coupled to network 1101 and receives signals from another network node. Micro controller 1501 receives channel assignment information from SCU 1360 and utilizes the channel assignment to select the wavelength and frequency of a channel carrying data for its associated node. A polarization controller 1503 under control of micro controller 1501 selects polarization of the received laser signals. In an alternate embodiment, a depolarizer replaces polarization controller 1503. The output of polarization controller 1503 is coupled to tunable filter 1507. Micro controller 1501 via wavelength tuning module 1505 operates tunable filter 1507. Wavelength tuning module 1505 selects a wavelength in response to micro controller 1501 providing a wavelength select signal. Tunable filter 1507 selects the wavelength of a receive channel under control of micro controller 1501. A coupler 1509 couples the output of tunable filter 1507 to a Mach-Zehnder Interferometer 1513. Interferometer 1513 includes two legs. A first leg includes dc bias module 1512 and a phase modulator 1516. A second leg includes dc bias module 1514 and a phase modulator 1518. Interferometer 1513 is not used as an interferometer in the receiver. Only the dc bias modules 1512 and 1514 are used in the receive function. Phase modulators 1516, 1518 are left unused in this receiver implementation. Micro controller 1501 provides quadrature control via bias control module 1511. Frequency selection is provided via micro controller 1501 controlling voltage-controlled oscillator 1515 that in turn provides a selected frequency to mixer/driver module 1517. The outputs of interferometer 1513 are applied to coupler 1519. The output of coupler 1519 is in turn applied to tunable filter 1521 which is controlled by micro controller 1501 via wavelength tuning module 1505. The wavelength-selected output of tunable filter 1521 is in turn applied to detector 1523. Detector 1523 provides a quadrature dc output, which is provided to micro controller 1501 for use in controlling bias control circuit 1511. An RF output of detector 1523 is provided to amplifier 1525. Output of amplifiers 1525 is coupled to a second input of mixer/driver 1517. An output of mixer/driver 1517 is applied to low pass filter 1529. The output of low pass filter 1529 provides data output signals $D_{RX}$ that are provided to an network node such as user 1331.

As can easily be seen from a comparison of FIGS. 14 and 15, the design of the optical network processor receive portion and transmit portion share similar basic design components in the implementations shown. The transmit portion and receive portions in one embodiment are implemented on tow separate chips for full duplex operation. In another embodiment of the invention, a bidirectional, half-duplex design combines both transmit and receive portions in a single integrated optic chip using reflective design. Advantages of the second embodiment are that the length of the integrated optic chip is shortened by ½; cost is reduced; and transmit and receive portions are combined into one design. In addition, performance of the wavelength filter is greatly enhanced for double pass operation. Sidelobe suppression of 15 dB for one pass through the filter increases to 30 dB with double pass operation. Still further, the drive voltage of the modulator is reduced 50%. A further significant advantage is that integration onto a single chip allows creation of a large sized phase detector.

FIG. 16 depicts a transceiver 1600 in which a single integrated optic chip 1670 is utilized advantageously. Transceiver 1600 is coupled to network 1101 and laser reference ring 1370. A circulator 1604 and an isolator interposed in the reference laser ring connect transceiver 1600 to both. Circulator 1604 is coupled to integrated optic chip 1603 via a polarization controller or scrambler 1603. Integrated optic chip 1670 includes a TM polarizer 1651 coupled to a tunable filter 1652. Micro controller 1601 receives transmit and receive channel assignment information from system control unit 1360 and utilizes the channel assignment information to select wavelength and frequency for transmit or receive functions. Micro controller 1601 via a wavelength-tuning module 1605 controls tunable filter 1652. A TE polarizer 1653 follows tunable filter 1652 to remove unwanted signals. A 2×2 coupler 1654 is disposed between TE polarizer 1654 and optical bias modulator 1656. Optical bias modulators 1612, 1614 are followed by phase modulators 1616, 1618. Reflection mirrors 1662, 1660 are provided on the end of integrated optic chip 1670. The operation of the various circuit elements shown in FIG. 16 is substantially identical to the operation of the elements in FIG. 14 for receive operation and to the elements in FIG. 15 for receive operation. There is a one to one correspondence to the elements of FIGS., 14, 15, and 16 and the operation is identical.

FIG. 17 depicts a transmitter portion 1700 of an optical network processor for use in the above described second embodiment of the invention. Transmitter portion 1700 includes a processor or micro controller 1701 that provides program control of operation of transmitter portion 1700. Micro controller 1701 receives channel assignment information from system control unit 1360 and utilizes that information to select wavelength, phase and frequency of assigned channels. Transmitter portion 1700 is coupled to laser reference network 1370 and receives multiple wavelength signals from laser reference source 1360. A polarization controller 1703 under control of micro controller 1701 selects polarization of the reference laser signals. The output of polarization controller 1703 is coupled to tunable filter 1707. Micro controller 1701 via wavelength tuning module 1705 controls tunable filter 1707. Wavelength tuning module 1705 selects a wavelength in response to micro controller 1701 providing a wavelength select signal. Tunable filter 1707 selects the wavelength optical signal for transmitting data under control of micro controller 1701. A coupler 1709 couples the output of tunable filter 1707 to phase selector for selecting one out of "" phases. The phase selector includes a 1×n switch 1771 that is controlled by micro controller 1701. Each of the N outputs of switch 1771 is coupled to a corresponding phase modulator 1775. Frequency selection is provided by micro controller 1701 controlling a voltage controlled oscillator 1715. The selected frequency output of voltage controlled oscillator 1715 is combined with data to be transmitted $D_{TX}$ by mixer/driver 1717. The data $D_{TX}$ to be transmitted is received from a user node 1331. A filter/switch module 1770 under control of micro controller 1701 provides the output of mixer/driver 1717 t the N phase modulators 1775. Each phase modulator 1775 is coupled to a phase delay module 1777. The outputs of the phase delay modules are the N phases Φ1 through ΦN. Switch 1779 under control of micro controller 1701 selects the output phase. The output of switch 1779 and the wavelength-selected reference are combined in coupler 119 and filtered by tunable wavelength filter 1721. Micro controller 1701 via wavelength tuning module 1705 controls tunable filter 1721. The output of filter 1721 is the wavelength/frequency/phase selected optical signal modulated with transmit data and is coupled to optical network 1101. A portion of the output is coupled to a detector 1723 that provides a dc feedback signal to micro controller 1701.

Figure 18:
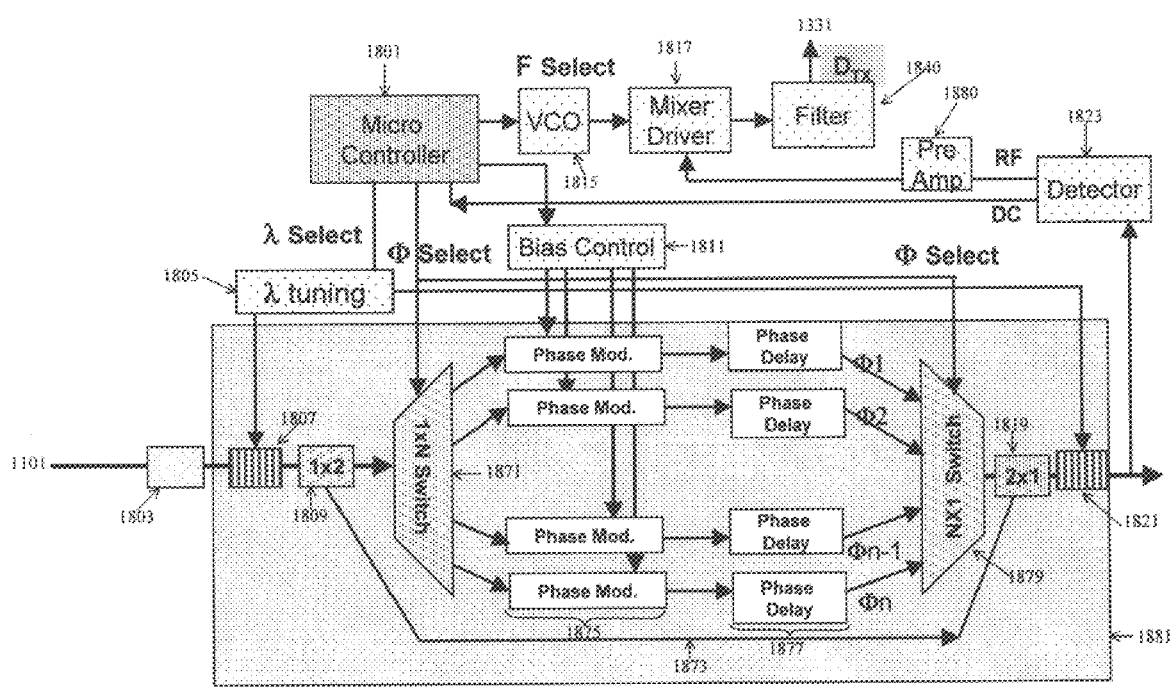
FIG. 18 is a detailed block diagram of a second portion of the third optical network processor useable in conjunction with the optical network processor portion of FIG. 17.

FIG. 18 depicts optical network processor receive portion 1800 for the above described second embodiment. Receive portion 1800 includes a processor or micro controller 1801 that provides program controlled operation of optical network processor receive portion. In addition, micro controller 1801 receives channel assignment information from system control unit 1360 and utilizes that information to select channel wavelength, phase and frequency to select a desired channel for recovery of received data. The received data is provided to a node 1331. Micro controller 1801 generates wavelength select, phase select and frequency select signals. The frequency select signals control a voltage-controlled oscillator 1815 to provide a frequency selected signal to a mixer/driver circuit 1817. The output of mixer/driver 1817 is filtered by filter 1840 to provide output data signals $D_{TX}$. Receive portion 1800 is coupled to network 1101 and receives optical signals carrying data $D_{TX}$ from another node coupled to network 1101. A depolarizer 1803 depolarizes the optical signals received via network 1101. As those skilled in the art will appreciate, depolarizer 1803 may be replaced with a polarization controller controlled by micro controller 1801. The output of depolarizer 1803 is coupled to tunable filter 1807. Micro controller 1801 via wavelength tuning module 1805 operates tunable filter 1807. Wavelength tuning module 1805 selects a wavelength in response to micro controller 1801 and tunes filter 1807 to the selected wavelength. Phase selection is accomplished by micro controller 1801 providing phase select signals to control switches 1871 and 1879. Switches 1871 and 1879 are used to select one phase delay path from a group of "n" phase delay, where "n" is the number of selectable phases. Each phase delay path includes a phase modulator 1875 and a phase delay circuit 1877. Micro controller 1871 via bias control 1811 controls phase modulators 1875. The output of the selected phase path is coupled via switch 1879 to coupler 1819. A phase reference signal is coupled from signals received from network 1101 from coupler 1871 to coupler 1919 via optical connection 1873. Coupler 1819 combines the phase reference signal from connection 1873 with the output of phase switch 1879. The combined output is applied to wavelength filter 1821 that is tuned to the wavelength selected by micro controller 1801. The output of tunable filter 1821 is coupled to detector 1823 that separates an RF signal and a dc servo feedback signal. The RF signal is applied to mixer/driver 1817 via pre amplifier 1880. All of the components shown within box 1881 may be fabricated on a single integrated optic chip using reflective design.

Figure 19:
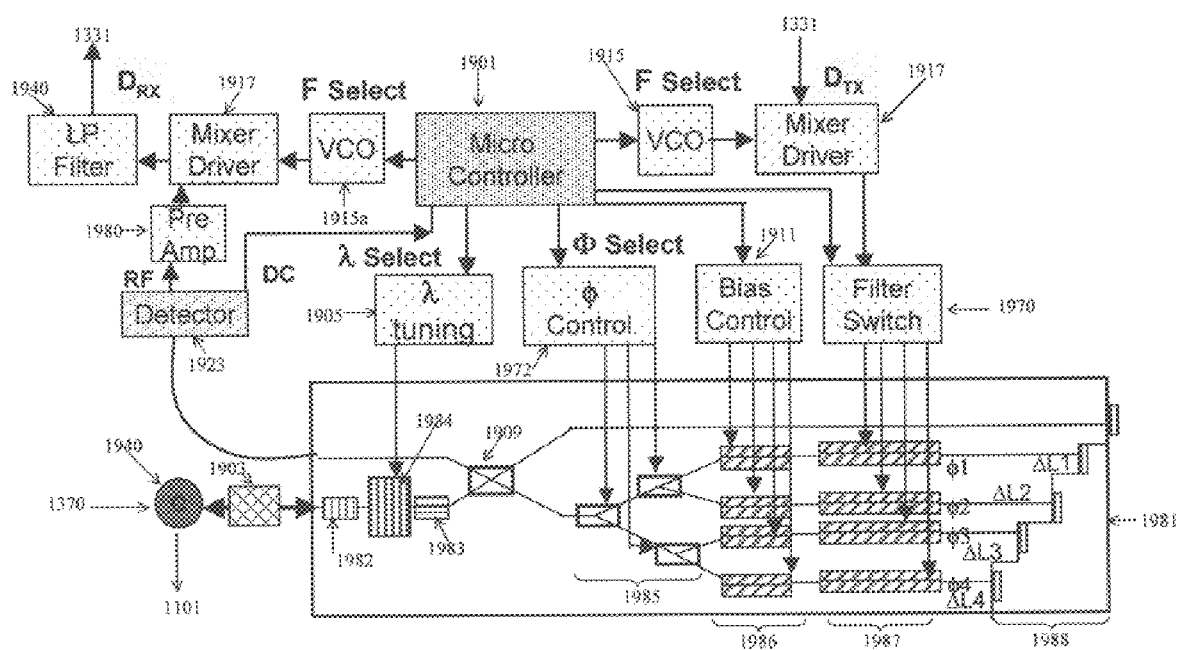
FIG. 19 is a detailed block diagram of a fourth optical network processor.

A comparison of transmit portion 1700 of FIG. 17 and receive portion 1800 of FIG. 18 shows that much of the functionality of the transmit portion and receive portion is similar. FIG. 19 is a block diagram of a transceiver 1900 in which economies are achieved by utilizing the commonality of receive and transmit portions, 1800, 1700. Transceiver 1900 receives data $D_{TX}$ from a node 1331 and provides data $D_{RX}$ to a node 1331. Transceiver 1900 is coupled to optical network 1101 and reference network 1370 by circulator 1940. A micro controller 1901 provides program controlled operation of transmit and receive functions. In addition, micro controller 1901 provides wavelength, phase and frequency selection to select a desired channel for recovery of received data and providing the received data to a node 1331 and for receipt of transmit data from node 1331 for transmission over network 1101. Micro controller 1901 generates wavelength select, phase select and frequency select signals for transmit and receive. The frequency select signals control a voltage-controlled oscillator 1915a to provide a frequency selected signal to a mixer/driver circuit 1917a. The output of mixer/driver circuit 1917a is filtered by low pass filter 1940 to provide output data signals $D_{RX}$.

Frequency select signals from micro controller 1901 are used for transmission of data from a node 1331 over network 1101. Frequency select signals control voltage controlled oscillator 1915 to select a desired transmit channel frequency. A mixer/driver 1917 combines the output of voltage-controlled oscillator 1915 and $D_{TX}$. The modulated frequency signals are applied to filter switch 1970. Micro controller 1901 also controls phase and wavelength selections. Phase selection is provide by micro controller 1910 providing phase selection signals to a phase control module 1972, bias control signals to bias control circuit 1911 and filter control signals to filter switch 1970. For transmit data, filter switch 1970 is active but bias control 1911 is not. Integrated optical chip assembly 1981 provides wavelength selection and phase multiplex selections. Integrated optical chip assembly 1981 utilizes reflective multiplex technology. Double pass operation of the integrated optical chip assembly 1981 greatly enhances performance of the wavelength filter operation. Sidelobe suppression is increased, for example, from 15 dB to 30 dB. Input signals received from network 1101 via circulator 1940 are applied to depolarizer 1903. Outputs of depolarizer 1903 are applied to a TE polarizer 1982. Polarizer 1982 is coupled to tunable wavelength filter 1983. Tunable filter 1983 is coupled to TM polarizer 1984. TM polarizer 1984 is coupled to a phase selection circuit including 2×2 coupler 1909, a 1×4 optical switch 1985, bias modulator array 1986, phase modulator array 1987 and phase delay and recovery reflection mirror 1988. In the embodiment shown, selection of four phase channels may be accomplished. The phase selection circuit may be expanded to more phase channels, but for purposes of drawing clarity, only a four phase channel selection structure is shown. For both transmit and receive, micro controller 1901 provides wavelength selection signals to wavelength tuning module 1905. Wavelength tuning module 1905 controls tunable filter 1983 to select the wavelength channel for transmit and receive.

For transmit functionality, micro controller 1901 controls filter switch 1970 to control the phase modulator array 1987. For receive functionality, micro controller 1901 controls bias control 1911 to in turn control bias modulator array 1986. For transmit functionality, filter switch 1970 is used to select a phase and couple the output of mixer/driver 1917 via coupler 1909 through polarizer 1983, wavelength filter 1983, polarizer 1982 to depolarizer 1903 and to network 1101 via circulator 1940. For receive functionality, optical signals received from network 1101 are coupled via circulator 1940 through depolarizer 1903 to polarizer 1982, tunable filter 1983, polarizer 1984 to the phase selector. Bias control module 1911 under control of micro controller 1901 sets the bias to a quadrature point to stabilize the receive phase channel. The output of the phase selector is coupled to detector 1923. Detector 1923 provides an RF output to preamplifier 1980. Preamplifier 1980 is coupled to mixer/driver 1917, and its output is filtered by lowpass filter 1940 to provide output data to node 1331. The invention has been described in conjunction with specific embodiments.

Reference Laser

Multiple lasers may be assembled together to provide a laser reference source useable in the optical networks and optical communication system of the invention. Various laser sources may be employed; however, each laser source must have specific characteristics. In particular, multiple wavelength lasers that have high launch power are desirable. In particular, it is desirable that the reference provides optical signals for each wavelength channel at levels greater than 20 mw and each laser source should desirably meet this requirement. It is also desirable that nonlinear effects such as self phase modulation (SPM), stimulated Brillion scattering (SBS) and four wave mixing be minimized. A short coherence length of less than 5 mm should be provided for phase multiplex/switching operation. To ensure proper wavelength multiplexing, wavelength stability is to be controlled within 20 picometers. It is desirable that spurious spectral components be minimized between wavelength channels. In particularly advantageous embodiments of the invention, 16 to 32 wavelengths are provided by the reference laser source.

Figure 20:
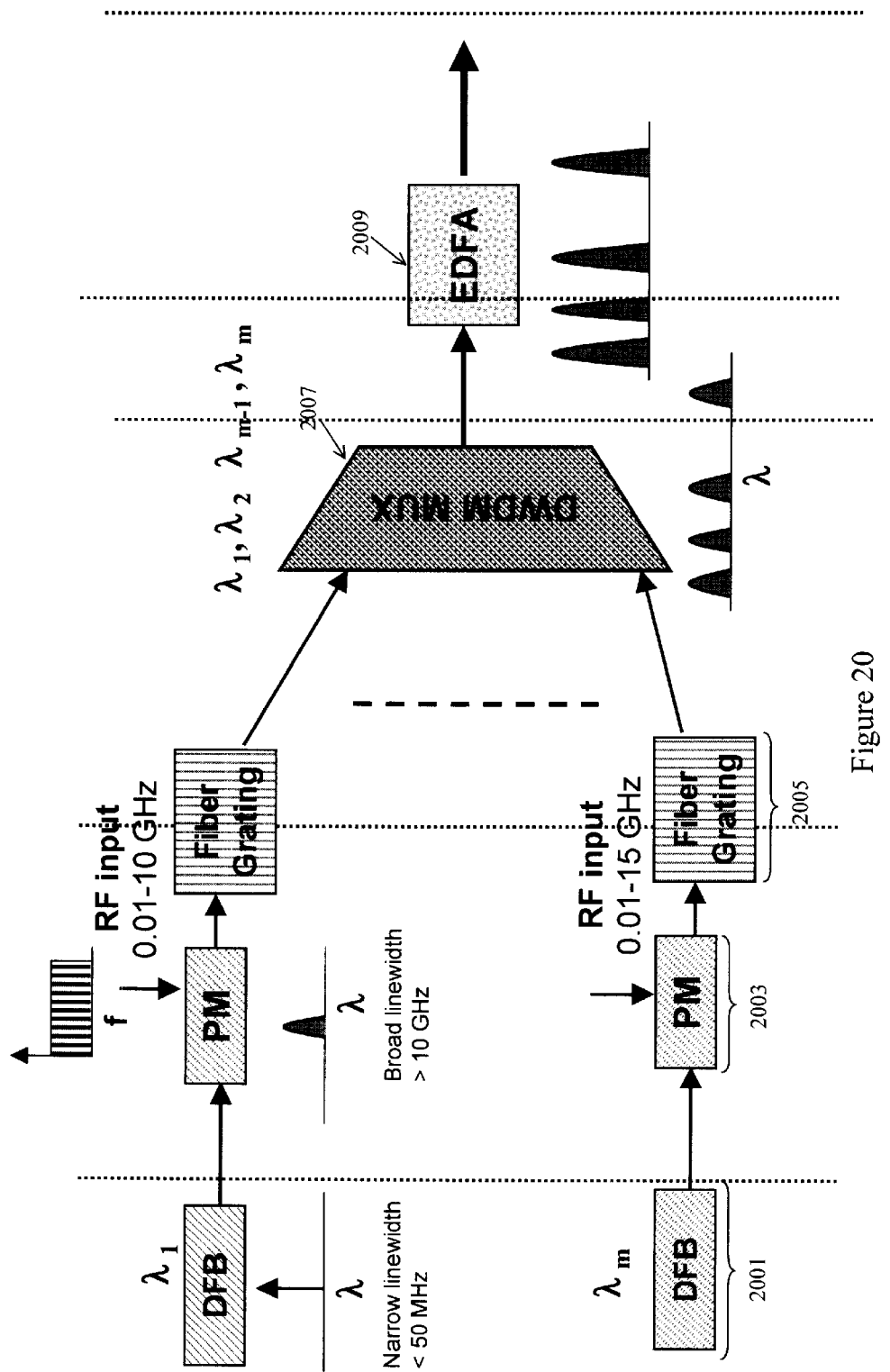
FIGS. 20 through 23 depict multiple wavelength laser reference sources.

FIG. 20 depicts one embodiment of a multiple wavelength reference laser source in which multiple distributed feedback (DFB) lasers are used. A separate DFB laser is used to generate each wavelength $\lambda_1$ through $\lambda_M$. There are two limitations on DFB lasers that need to be accommodated. First, the output of each DFB laser 2001 typically has a narrow linewidth of less than 50 MHz. This spectral width is too narrow for use in the embodiments of the invention described above. Second, the coherence length of the DFB output is too large for application in the embodiments of the present invention. Phase modulating the output of the DFB laser with an RF signal broadens the spectral width of the output and further can reduce the coherence length. In other words, for optimum performance, the laser signals can not be too coherent and can not have too narrow a line width in the above-described embodiments. A phase modulator 2003 is coupled to each DFB laser 2001. Modulation is with an RF signal having multiple frequency components that are selected in the RF range of 0.01 to 10.0 GHz. Modulation with a multiple component RF signal produces a laser signal having a broad line width output of greater than 20 GHz. In addition, the phase modulation reduces the coherence length. Each modulated laser output is filtered to remove sidelobes by utilizing fiber gratings 2005 to shape the modulated laser output spectrum. A DWDM multiplexer 2007 is utilized to combine the outputs of each of the DFB lasers. Amplifier 2009 amplifies the resulting multiple wavelength laser output. Amplifier 2009 is an EDFA.

Figure 21:
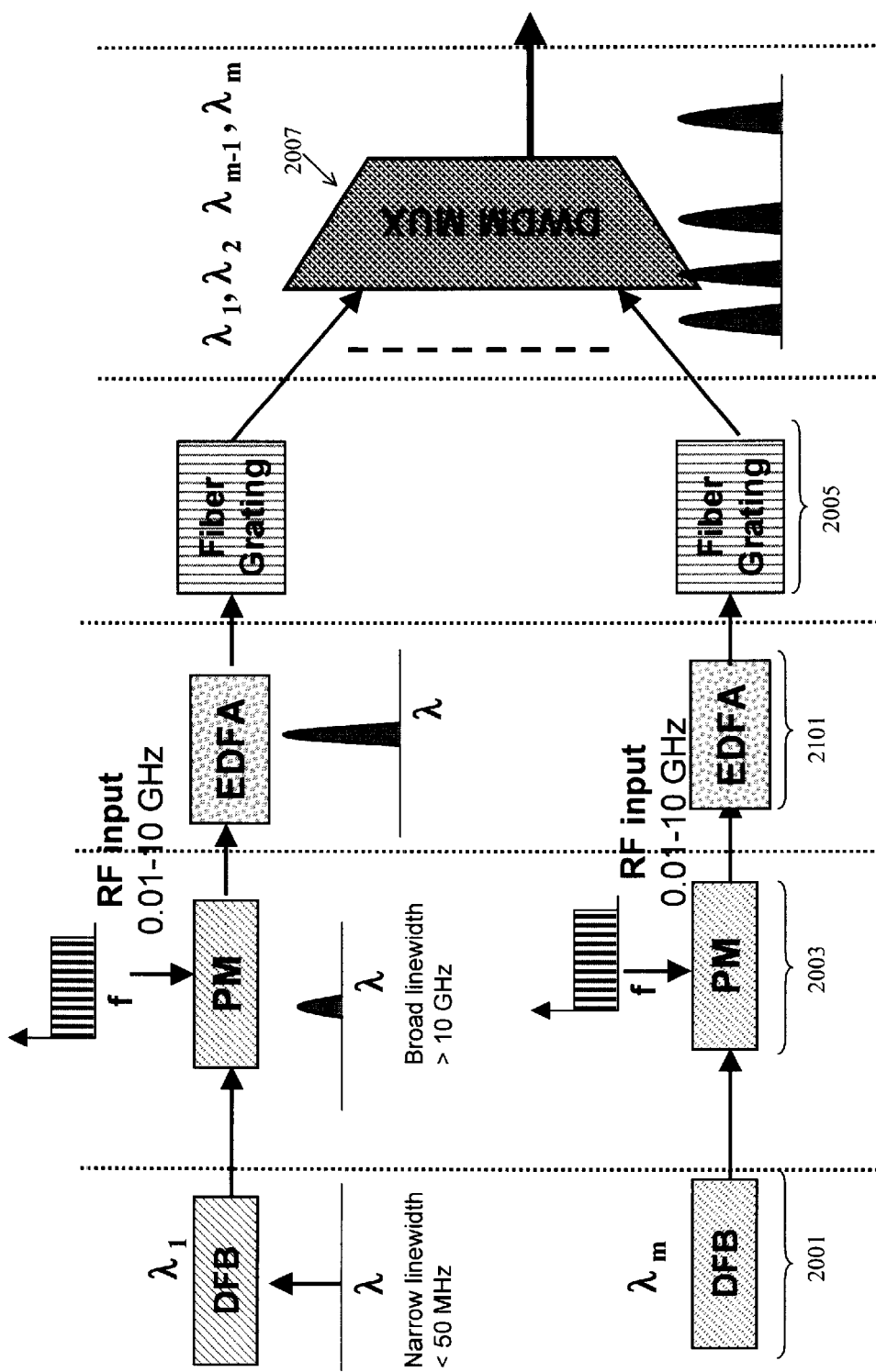

FIG. 21 illustrates a modification to the multiple wavelength laser source of FIG. 20. In the design of FIG. 21, the phase modulated laser signals at the different wavelengths are each amplified by EDFA amplifiers 2101 prior to being shaped by fiber gratings 2005. By amplifying each wavelength component prior to combining the wavelength components, it I possible to achieve a combined output in which the components are more uniform and a higher output level may b achieved.

Figure 22:
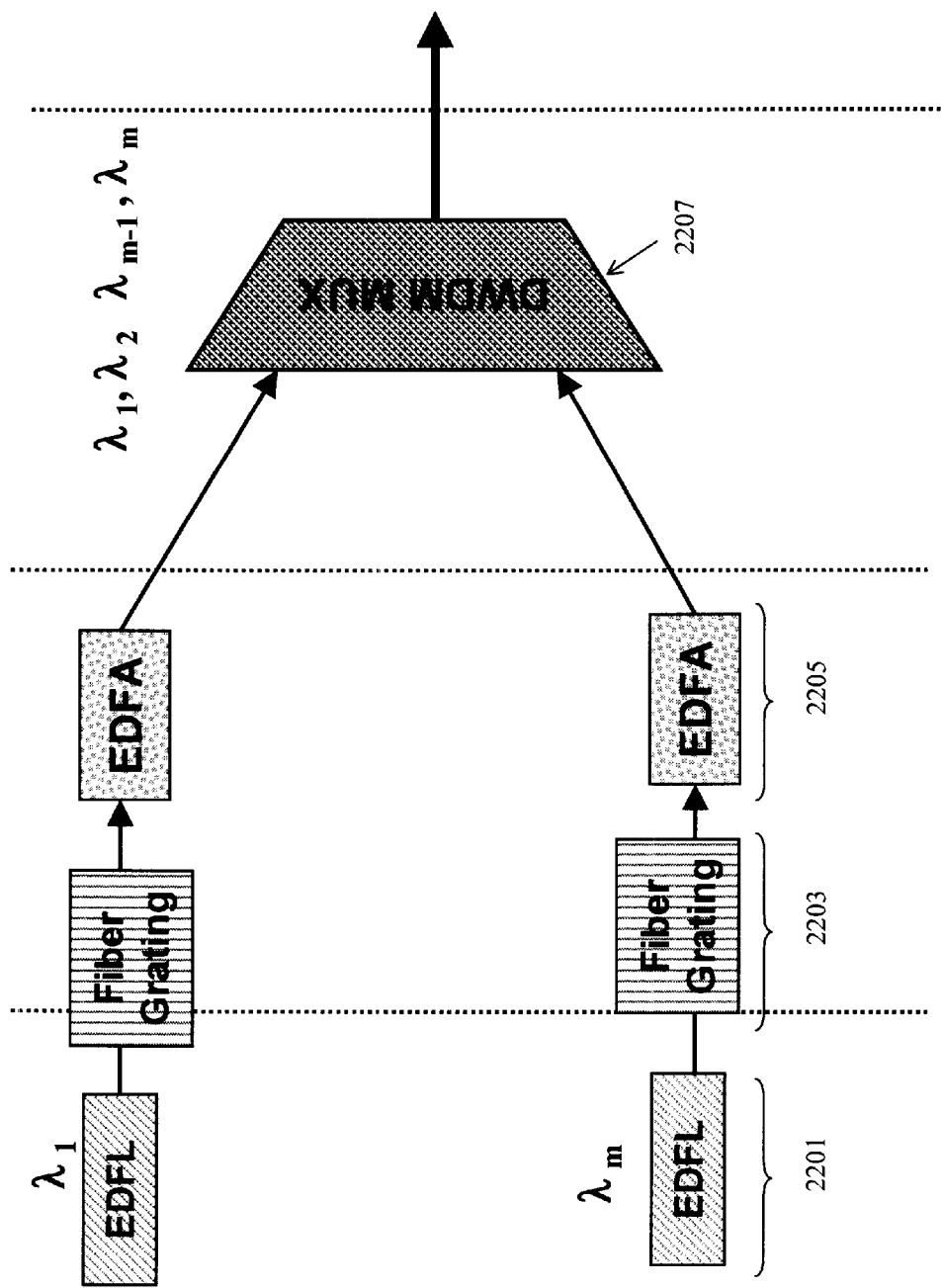

FIG. 22 illustrates a third embodiment of a multiple wavelength laser source that may be used in accordance with the invention. Separate Erbium Doped Fiber Lasers (EDFL) 2201 are used as sources. Wavelength control technology is used to control EDFL emission wavelength. Each EDFL provides a single wavelength output. Fiber gratings 2203 are used to provide output spectrum shaping and coherence function. EDFAs 2205 amplify each output and a DWDM multiplexer 2207 is used to combine the outputs to produce a multiple wavelength laser output. By using EDFLs, phase modulation is not necessary because the EDFLs have a broader line width and the coherence length is not too short. Through selection of appropriate fiber gratings the desired spectral response is achieved.

Figure 23:
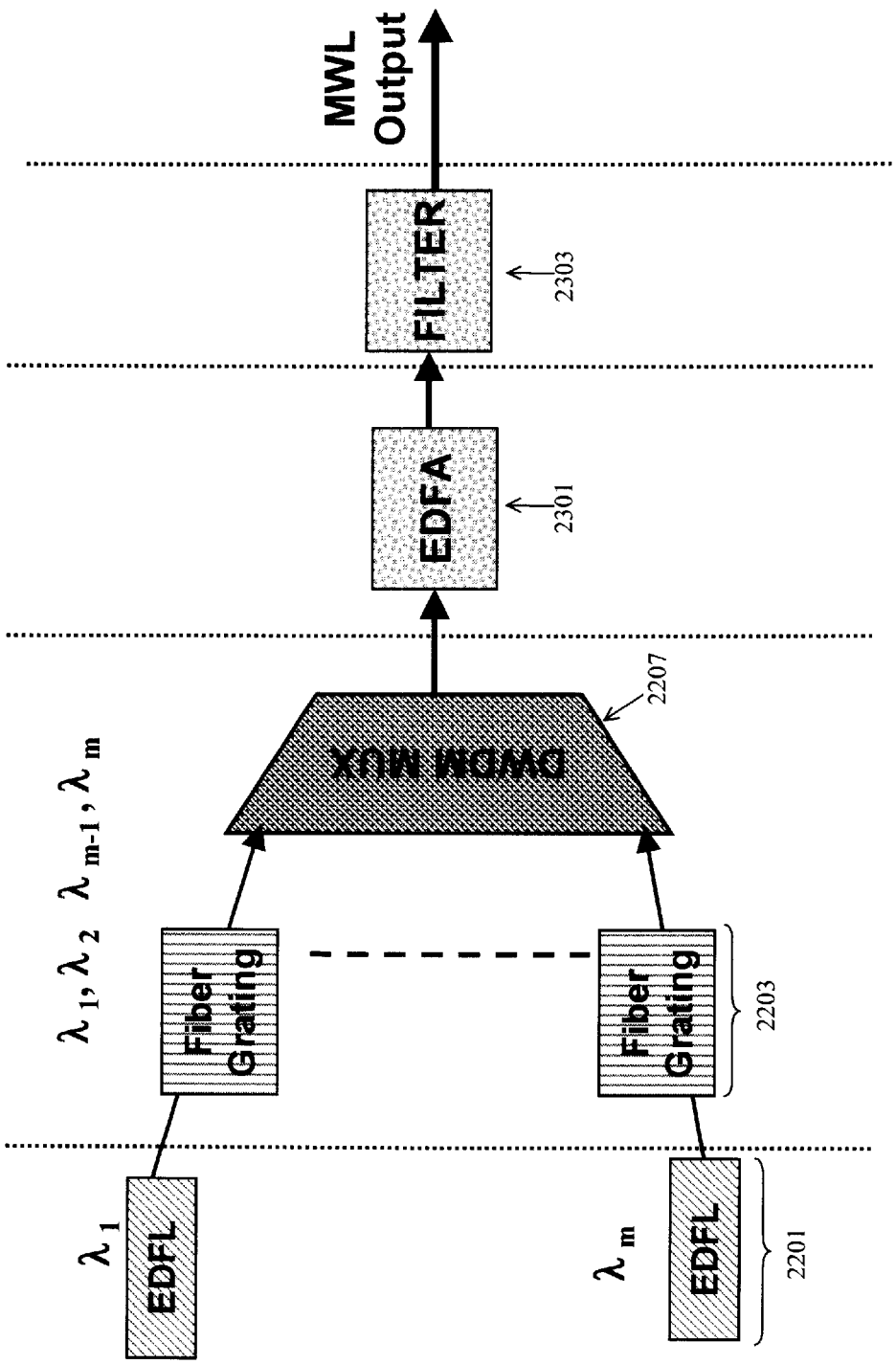

An alternative EDFL based design for the multiple wavelength laser reference is illustrated in FIG. 23. In the reference source of FIG. 23, rather than separately amplify each wavelength, a single EDFA amplifier 2301 is utilized to amplify the combined output. A filter 2303 is used to shape the amplified multiplexed output.

Figures 24, 25:
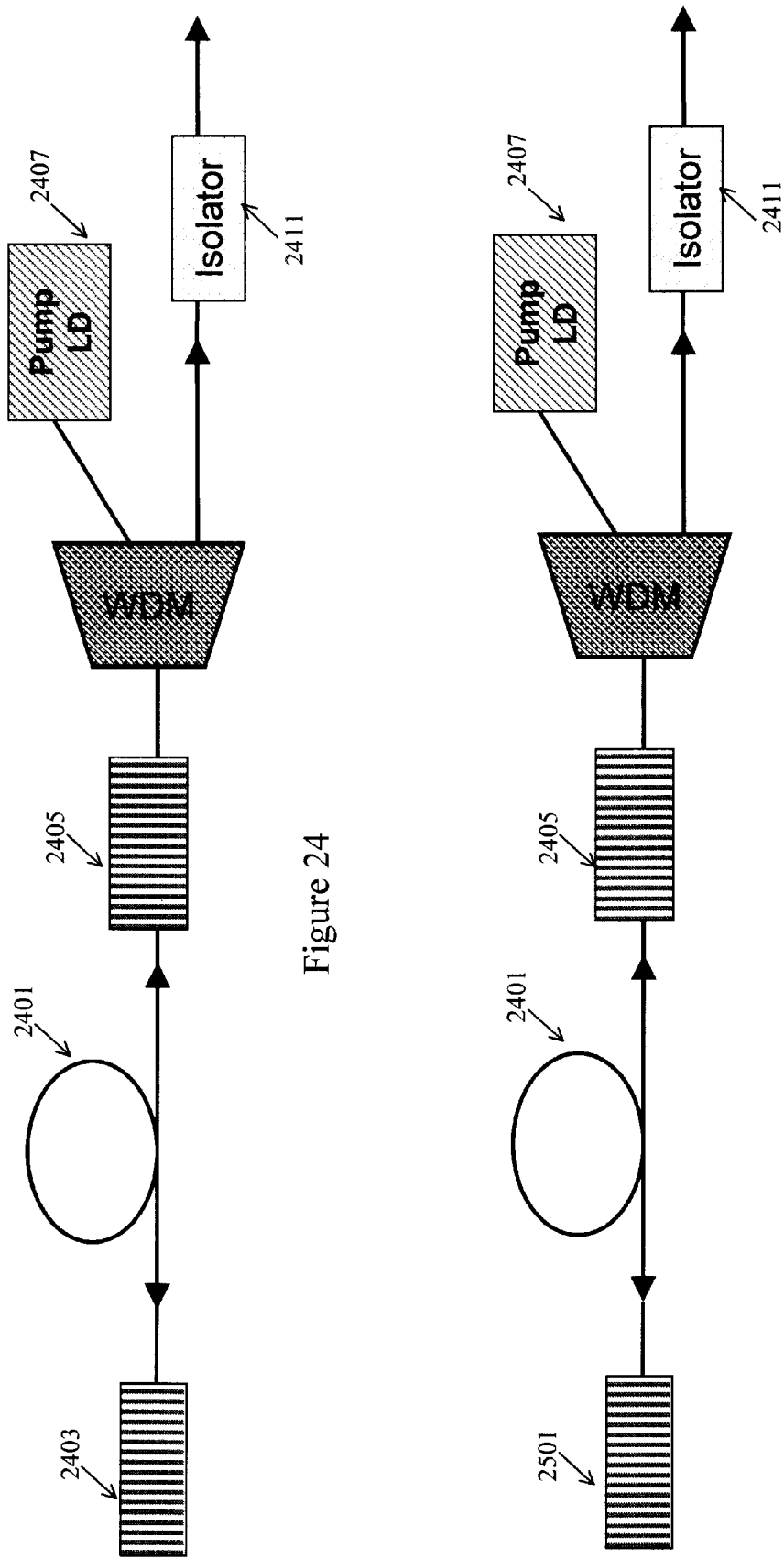
FIGS. 24 and 25 depict Erbium doped fiber lasers (EDFLs) utilized in the reference sources of FIGS. 20 through 23.

FIGS. 24 and 25 illustrate EDFLs suitable for application to the laser reference sources depicted in FIGS. 22 and 23. In the EDFLs of both FIGS. 23 and 24, an erbium doped fiber 2401 is pumped from a laser pump source 2407. The fiber 2401 is coupled at either end to a fiber grating. In the embodiment of FIG. 24, both gratings 2403 and 2405 are reflecting narowband gratings at the same wavelength. In the embodiment of FIG. 25 the narrow band fiber grating 2403 is replaced with a broadband reflecting grating 2501 or alternatively, a mirror. WDM 2409 couples the pump source 2407 output to fiber grating 2405. An isolator 2411 is used at the output of the EDFL.

Figure 26:
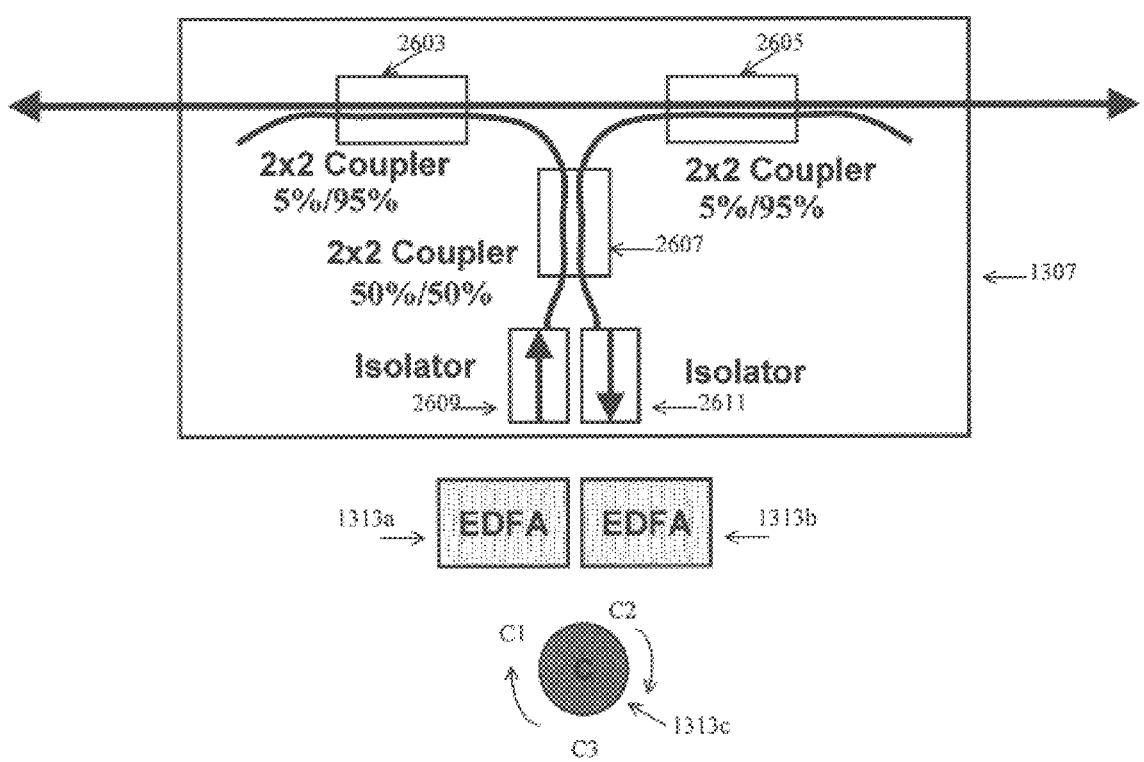
FIG. 26 depicts an optical add/drop (OAD).

FIG. 26 depicts an optical add/drop 1307 that is utilized to particular advantage in the embodiments of the invention described above. In addition, FIG. 26 also shows further details of a typical EDFA construction, such as EDFA 1313. The design shown is for a reciprocal optical add/drop inserted into optical link network 1101. Optical add/drop 1307 utilizes three couplers 2603, 2605, 2607 and two isolators 2609, 2611 all of which are known in the art and are commercially available. Optical add/drop 1307 includes a first bidirectional port P1, a second bidirectional port P2 and a third bi-directional port P3. Bi-directional ports P1 and P2 are connected to optical link network 1101 and bi-directional port P3 is coupled to an optical network processor or coupler via bi-directional amplifier 1313. Drop signals from optical link network 1101 are coupled from coupler 2605 to coupler 2607 and to isolator 2611. Isolator 2611 couples the optical signals to amplifier 1313. Add signals from amplifier 1313 are supplied to isolator 2609. From isolator 2609, the transmit signals are supplied to coupler 2607 which in turn is connected to coupler 2603 and from coupler 2603 to optical link network 1101. A through path couples the couplers 2603 and 2605. Coupler 2607 is utilized to permit the bi-directional drop and add of optical signals. Each of couplers 2603 and 2605 are chosen in the illustrative embodiment such that 5% of the optical signal is coupled to an add/drop path and 95% of the optical signal is passed on the through path of the coupler. Coupler 2607 is chosen such that 50% of the signal is coupled from one path to the other. Isolators 2609, 2611 are used to provide directionality for the add and drop paths to the ONP or coupler. Amplifier 1331 comprises an EDFA 1313$a$ for amplifying output signals and an EDFA 1313$b$ for amplifying input signals. A circulator 1313$c$ having three ports c1, c2, c3 is used to couple both EDFAs 1313$a$, 1313$b$ to the optical network processor or coupler. Drop signals from P1 are extracted via coupler 2603 and are coupled via coupler 2607 to isolator 2611, amplified by EDFA 1313$b$, applied to circulator 1313$c$ at its port c2 and extracted from circulator at port c3 which is connected to an optical network processor at port P3.

Optical signals at port P2 are coupled by coupler 2605 to coupler 2607 and processed as described above. Optical signals received at port P3 are provided by circulator 1313$c$ to EDFA 1313 and applied to isolator 2609. The output in this add path is applied to coupler 2607 provides 50% of the add signal to each of couplers 2603, 2605. Because the same level of signals are achieved in transmission of signals from ports P1 to P2 as are achieved from ports P2 to P1 and between any combination of pairs of the three ports P1, P2, P3, the optical add/drop in this embodiment may be characterized as a reciprocal add/drop.

It will be appreciated by those skilled in the art that various changes and modifications may be made to the various embodiments without departing from the spirit or scope of the invention. It is intended that those various changes and modifications be included within the scope of the invention. It is further intended that the invention not be limited to the various embodiments shown and described herein nor limited to those embodiments that would be apparent as of the filing date of this application. It is intended that the invention be limited in scope only by the claims appended hereto.

What is claimed is:

1. A method of operating an optical network coupling a plurality of nodes, comprising:

providing a plurality of optical communications channels, each channel being determined by three optical signal variables, a first one of said variables being a wavelength selected from a plurality of predetermined wavelengths, a second one of said variables being a phase selected from a plurality of predetermined phases, and a third one of said variables being a modulation frequency selected from a plurality of modulation frequencies; and utilizing said optical communication channels for communication between said plurality of nodes.

2. A method in accordance with claim 1, comprising:

determining each said channel from selected first ones of said variables and from selected second ones of said second variables.

3. A method in accordance with claim 1, comprising:

determining each said channel from selected first ones of said first variable, and from selected ones of said second variables, and from selected third ones of said third variables.

4. A method of improving channel capacity and bandwidth of optical fiber networks comprising a plurality of nodes each coupleable to a network comprising optical fiber disposed between said plurality of nodes, said method comprising:

providing communications channels for transmission of information over said optical fiber network; and defining each of said communication channels by a selected wavelength selected from a plurality of selected wavelengths and by a selected modulation frequency selected from a plurality of selected modulation frequencies and a selected phase selected from a plurality of selected optical phases.

5. A method in accordance with claim 4, comprising:

providing a source of reference signals; and synchronizing each of said channels to said source of reference signals.

6. A method in accordance with claim 4, comprising:

defining each of said communication channels by a selected wavelength selected from a plurality of selected wavelengths and by a selected modulation frequency selected from a plurality of selected modulation frequencies and a selected phase selected from a plurality of selected optical phases.

7. A method in accordance with claim 6, comprising:

providing a source of reference signals; and synchronizing each of said channels to said source of reference signals.

8. A method in accordance with claim 4, comprising:

providing a laser source as a source of optical reference signals; and synchronizing each of said channels to said source of reference signals.

9. A method in accordance with claim 8, comprising:

distributing said reference signals to each of said nodes.

10. A method in accordance with claim 4, wherein:

said network is in a ring configuration.

11. A method in accordance with claim 4, wherein:

said network is in a star configuration.

12. A method in accordance with claim 4, wherein:

said network is in a mesh configuration.

13. A method in accordance with claim 5, comprising:

distributing said reference signals to said nodes via a distribution.

* * * * *